United States Patent  (10) Patent No.: US 11,969,796 B2
Yousefiani  (45) Date of Patent: Apr. 30, 2024

(54) TUNED MULTILAYERED MATERIAL SYSTEMS AND METHODS FOR MANUFACTURING

(71) Applicant: The Boeing Company, Chicago, IL (US)

(72) Inventor: Ali Yousefiani, Tustin, CA (US)

(73) Assignee: The Boeing Company, Arlington, VA (US)

( * ) Notice: Subject to any disclaimer, the term of this patent is extended or adjusted under 35 U.S.C. 154(b) by 173 days.

(21) Appl. No.: 16/733,390

(22) Filed: Jan. 3, 2020

(65) Prior Publication Data
US 2021/0205883 A1 Jul. 8, 2021

(51) Int. Cl.
B22F 3/11 (2006.01)
B22F 3/24 (2006.01)
B22F 7/00 (2006.01)
B22F 7/02 (2006.01)

(52) U.S. Cl.
CPC .............. B22F 3/1112 (2013.01); B22F 3/24 (2013.01); B22F 7/004 (2013.01); B22F 7/02 (2013.01); B22F 2003/242 (2013.01); B22F 2207/01 (2013.01)

(58) Field of Classification Search
CPC ........ B22F 3/112; B22F 2207/17; B22F 7/02; B22F 1/0051; B22F 3/1112
See application file for complete search history.

(56) References Cited

U.S. PATENT DOCUMENTS

| 3,633,520 | A | | 1/1972 | Stiglich | |
| 3,781,170 | A | | 12/1973 | Nakao et al. | |
| 3,802,850 | A | | 4/1974 | Clougherty | |
| 3,804,034 | A | | 4/1974 | Stiglich | |
| 4,674,675 | A | | 6/1987 | Mietrach | |
| 6,037,066 | A | * | 3/2000 | Kuwabara | B22F 7/008 361/708 |
| 6,071,628 | A | * | 6/2000 | Seals | C23C 28/00 428/610 |
| 6,136,452 | A | * | 10/2000 | Munir | B22D 13/00 164/114 |
| 6,322,897 | B1 | * | 11/2001 | Borchert | B22F 3/1109 428/469 |

(Continued)

FOREIGN PATENT DOCUMENTS

| CN | 107805728 A | * | 3/2018 | |
| CN | 108620594 A | * | 10/2018 | ............... B22F 3/14 |

(Continued)

OTHER PUBLICATIONS

"Cenospheres", Ceno Technologies, retrieved from http://cenotechnologies.com/cenosphere_technology.php; on Sep. 15, 2021 (Year: 2021).*

(Continued)

Primary Examiner — Samir Shah
Assistant Examiner — Austin Pollock
(74) Attorney, Agent, or Firm — Walters & Wasylyna LLC

(57) ABSTRACT

A graded multilayered composite comprises a metal matrix material having a first side and a second side opposite the first side. A first layer of microspheres is dispersed on the first side of the metal matrix material. A second layer of microspheres is dispersed on the second side of the metal matrix material.

20 Claims, 16 Drawing Sheets

(56) References Cited

U.S. PATENT DOCUMENTS

| | | | |
|---|---|---|---|
| 6,916,529 B2* | 7/2005 | Pabla | F01D 11/127 |
| | | | 428/335 |
| 7,037,865 B1 | 5/2006 | Kimberly | |
| 7,041,250 B2 | 5/2006 | Sherman et al. | |
| 7,910,219 B1 | 3/2011 | Withers et al. | |
| 8,110,143 B2 | 2/2012 | Rabiei | |
| 8,535,604 B1 | 9/2013 | Baker et al. | |
| 10,647,618 B2* | 5/2020 | Schaedler | C09D 1/00 |
| 2002/0088340 A1 | 7/2002 | Chu et al. | |
| 2003/0180171 A1 | 9/2003 | Artz et al. | |
| 2004/0028941 A1* | 2/2004 | Lane | C04B 41/87 |
| | | | 428/689 |
| 2006/0065330 A1 | 3/2006 | Cooper et al. | |
| 2006/0172073 A1* | 8/2006 | Groza | C04B 35/64 |
| | | | 427/372.2 |
| 2008/0223539 A1 | 9/2008 | Cooper et al. | |
| 2010/0192808 A1 | 8/2010 | Datta et al. | |
| 2010/0266790 A1 | 10/2010 | Kusinski et al. | |
| 2011/0160104 A1 | 6/2011 | Wu et al. | |
| 2012/0103135 A1 | 5/2012 | Xu et al. | |
| 2012/0174811 A1* | 7/2012 | Treadway | F42B 12/02 |
| | | | 102/315 |
| 2012/0196147 A1* | 8/2012 | Rabiei | B32B 5/16 |
| | | | 428/613 |
| 2012/0234681 A1* | 9/2012 | Lomasney | C25D 5/50 |
| | | | 205/50 |
| 2014/0272451 A1* | 9/2014 | Loukus | C22C 47/12 |
| | | | 428/610 |
| 2018/0133789 A1* | 5/2018 | Martin | C22C 1/1036 |

FOREIGN PATENT DOCUMENTS

| | | | | |
|---|---|---|---|---|
| CN | 110238403 A | * | 9/2019 | B22F 3/14 |
| JP | S56-74390 | | 6/1981 | |
| JP | H01-241375 | | 9/1989 | |
| JP | 2016003392 A | * | 1/2016 | C04B 35/583 |

OTHER PUBLICATIONS

Kumar B.R., et al.; "Data characterizing tensile behavior of cenopshere/HDPE syntactic foam"; Data in Brief, vol. 6.; p. 933-941 (Year: 2016).*

"Cenospheres", Ceno Technologies, retrieved from http://cenotechnologies.com/cenosphere_technology.php; on Sep. 3, 2022, wayback machine, 2019 (Year: 2019).*

Kumar B.R., et al.; "Data characterizing tensile behavior of cenopshere/HDPE syntactic foam"; Data in Brief, vol. 6.; p. 933-941 (Year: 2016) (Year: 2016).*

Chin, "Army focused research team on functionally graded armor composites", *Materials Science and Engineering*. A 259.2, pp. 155-161 (1999).

Yang et al., "A Study on Propagation Characteristic of One-dimensional Stress Wave in Functionally Graded Armor Composites", *Journal of Physics: Conference Series* 419, No. 1 (2013).

Jerusalem et al., "Grain size gradient length scale in ballistic properties optimization of functionally graded nanocrystalline steel plates", *Scripta Materialia*, vol. 69, Issues 11-12, pp. 773-776, (Dec. 2013).

Gupta et al., "Ballistic Studies on $TiB_2$—Ti Functionally Graded Armor Ceramics", *Defence Science Journal*, vol. 62, No. 6, pp. 382-389 (Nov. 2012).

Ubeyli et al.: "The ballistic performance of SiC-AA7075 functionally graded composite produced by powder metallurgy," *Materials & Design* (1980-2015), vol. 56, pp. 31-36 (Apr. 2014).

Hugh A. Bruck: "A one-dimensional model for designing functionally graded materials to manage stress waves," *International Journal of Solids and Structures*, vol. 37, Issue 44, pp. 6383-6395 (Nov. 1, 2000).

Li et al.: "Fabrication and characterization of a functionally graded material from Ti—6Al—4V to SS316 by laser metal deposition," *Additive Manufacturing*, vol. 14, pp. 95-104 (2017).

Pardal et al.: "Dissimilar metal joining of stainless and titanium using copper as transition metal," *Int. J. Adv. Manuf. Technol.*, vol. 86, pp. 1139-1150 (2016).

Shiue et al.: "Infrared Brazing of Ti—6Al—4V and 17-4 PH Stainless Steel with a Nickel Barrier Layer," *Metallurgical and Materials Transactions* A, vol. 37A (2006).

European Patent Office, Patent abstract of JP H01-241375.

European Patent Office, Patent abstract of JP S56-74390.

European Patent Office, Parial European Search Report, App. No. 20205293.2 (dated Apr. 20, 2021).

Gupta et al.: "Comparison of compressive properties of layerd sytntactic foams having gradient in microballoon volume fraction and wall thickness," *Materials Science and Engineering*, vol. 427, No. 1-2, pp. 331-342 (Jul. 15, 2006).

European Patent Office, Extended European Search Report, App. No. 20205293.2 (dated Jul. 21, 2021).

Canadian Intellectual Property Office, Office Action, App. No. 3,098,381 (dated Dec. 7, 2023).

European Patent Office, "Communication pursuant to Article 94(3) EPC," App. No. 20205293.2 (Mar. 11, 2024).

\* cited by examiner

TUNED MULTILAYERED MATERIAL SYSTEMS AND METHODS FOR MANUFACTURING

FIELD

The present application relates to the field of multilayered materials and methods for manufacturing tuned multilayered material systems (TMMS), particularly tuned multilayered material systems for extreme environment hypersonic airframe structures, including the fuselage, wings, tails, control surfaces, leading edges, internal structure, air induction system, and thermal protection systems in general.

BACKGROUND

Traditional materials with the ability to provide a path to manufacturable, durable, and rapidly deployable extreme environment hypersonic airframe structure, including the fuselage, wings, tails, control surfaces, leading edges, internal structure, and air induction system are expensive and require long fabrication cycles. To deliver affordable and robust airframe structures and thermal protection systems for future extreme environment applications, new technologies are required that can offer multilayered material systems tuned to locally meet stringent thermomechanical loading requirements on an airframe.

Accordingly, those skilled in the art continue with research and development in the field of tuned multilayered material systems.

SUMMARY

In one example, a graded multilayered composite comprises a metal matrix material having a first side and a second side opposite the first side. The graded multilayered composite also comprises a first layer of microspheres dispersed on the first side of the metal matrix material, and a second layer of microspheres dispersed on the second side of the metal matrix material.

In another example, a graded multilayered material system comprises a non-graded multilayered composite. The graded multilayered material system also comprises at least one graded layer joined to the non-graded multilayered composite and selected from a graded metal liner, a graded ceramic liner, a graded metal-ceramic hybrid liner, a graded metallic core, a graded cooling channel structure, and a graded environmental barrier coating.

In yet another example, a method is provided for manufacturing a multilayered material system. The method comprises providing a graded multilayered composite, and joining at least one layer to the graded multilayered composite to provide the multilayered material system.

In still another example, a method is provided for manufacturing a multilayered material system. The method comprises providing a non-graded multilayered composite, and joining at least one graded layer to the non-graded multilayered composite to provide the multilayered material system.

In one example, a multilayered material system includes at least one of a liner sheet and a cellular core, and a multilayered composite (e.g., a multilayered metal matrix composite) joined to the at least one of a liner sheet and a cellular core. The multilayered composite includes hollow microspheres dispersed within a metallic matrix material.

In another example, a method for manufacturing a multilayered composite includes providing a first layer of a first powder having first hollow microspheres dispersed therein, providing a second layer of a second powder adjacent the first layer of first powder, and heating the first layer of first powder and the second layer of second powder. The second layer of second powder has second hollow microspheres dispersed therein.

In yet another example, a method for manufacturing a multilayered material system includes providing a first layer of a first powder having first hollow microspheres dispersed therein, providing a second layer of a second powder adjacent the first layer of first powder, sintering the first layer of first powder and the second layer of second powder, providing at least one of a liner sheet and a cellular core, and joining the first layer of sintered first powder with the at least one of a liner sheet and a cellular core. The second layer of the second powder has second hollow microspheres dispersed therein.

Other examples of the disclosed multilayered material systems and methods of the present description will become apparent from the following detailed description, the accompanying drawings and the appended claims.

DETAILED DESCRIPTION

Figure 1:
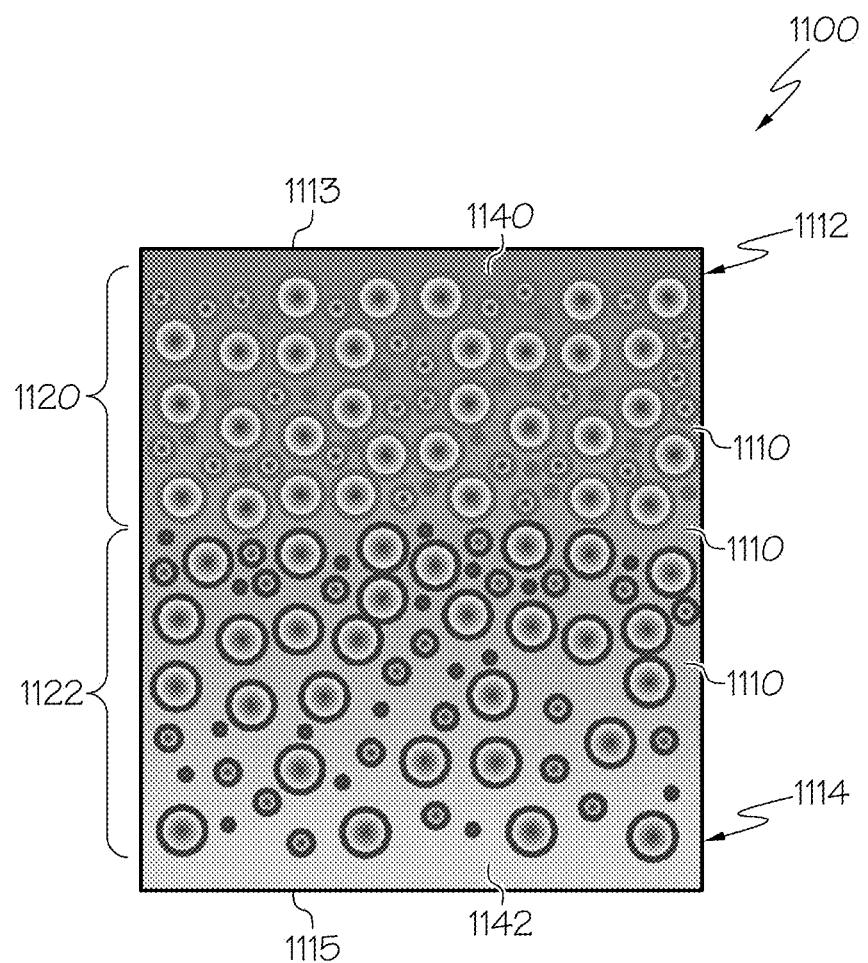
FIG. 1 is a cross-sectional view of an example of a graded multilayered composite according to the present description.

FIG. 1 is a cross-sectional view of an example of a multilayered composite 1100 according to the present description. The multilayered composite 1100 is a graded multilayered composite that includes a metal matrix material 1110 having a first side 1112 and a second side 1114 opposite the first side 1112. The graded multilayered composite 1100 also includes a first layer 1120 of microspheres dispersed on the first side 1112 of the metal matrix material 1110, and a second layer 1122 of microspheres dispersed on the second side 1114 of the metal matrix material 1110.

The multilayered composite 1100 is graded based upon a combination of grading factors. As an example, a first portion of the multilayered composite 1100 may have a density that is different from a density of a second portion of the multilayered composite 1100. As another example, the metal matrix material 1110 may comprise a compositionally graded material, such as a hybrid titanium-based and nickel-based material system.

As still another example, the microspheres of the first layer 1120 of microspheres may be spatially distributed relative to each other based upon a first spatial gradation, and the microspheres of the second layer 1122 of microspheres may be spatially distributed relative to each other based upon a second spatial gradation which is different from the first spatial gradation. In an example implementation, the first and second spatial gradations may be based upon number of microspheres. In another example implementation, the first and second spatial gradations may be based upon size of microspheres. Other grading factors and any combination of grading factors associated with the multilayered composite 1100 are possible.

The graded multilayered composite 1100 further comprises a first buffer region 1140 defined between the first layer 1120 of microspheres and a first edge 1113 on the first side 1112 of the metal matrix material 1110. The graded multilayered composite 1100 also comprises a second buffer region 1142 defined between the second layer 1122 of microspheres and a second edge 1115 on the second side 1114 of the metal matrix material 1110. Each of the first buffer region 1140 and the second buffer region 1142 is substantially devoid of microspheres. The first buffer region 1140 and the second buffer region 1142 ensure that no partial microsphere is in the vicinity of the first edge 1113 and the second edge 1115, which could result in a weak material stress point.

Figure 2A:
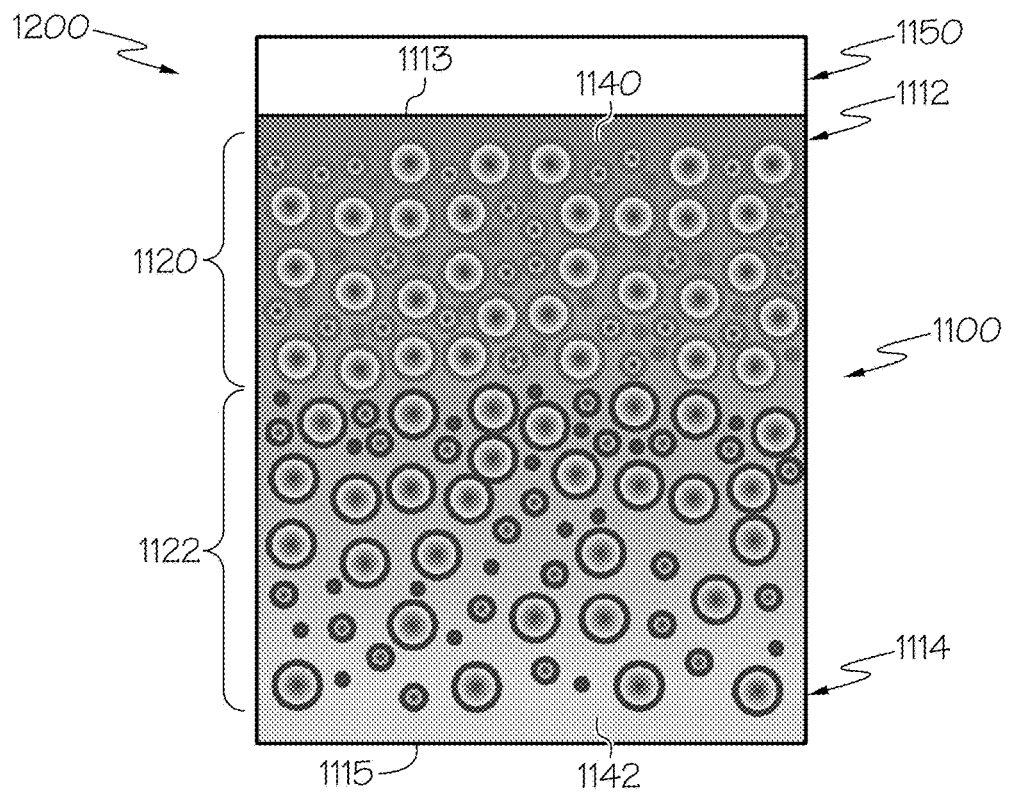
FIG. 2A is a cross-sectional view of the graded multilayered composite of FIG. 1 joined to a single-layer structure to form a graded multilayered material system.

FIG. 2A is a cross-sectional view of the graded multilayered composite 1100 of FIG. 1 joined to a single-layer structure 1150 to form a graded multilayered material system 1200. The single-layer structure 1150 may be selected from a metallic liner (e.g., a monolithic metal, metal alloy, metal matrix composite, intermetallic alloy, intermetallic matrix composite, complex concentrated alloy, or complex concentrated matrix composite), a ceramic liner (e.g. monolithic ceramic, ceramic matrix composite, or complex concentrated ceramic alloy), a metallic-ceramic hybrid liner, a metallic core, a cooling channel structure (which defines one or more cooling channels), and an environmental barrier coating. The single-layer structure 1150 may comprise a graded material (e.g., a graded metallic or a graded ceramic or a graded hybrid).

Figure 2B:
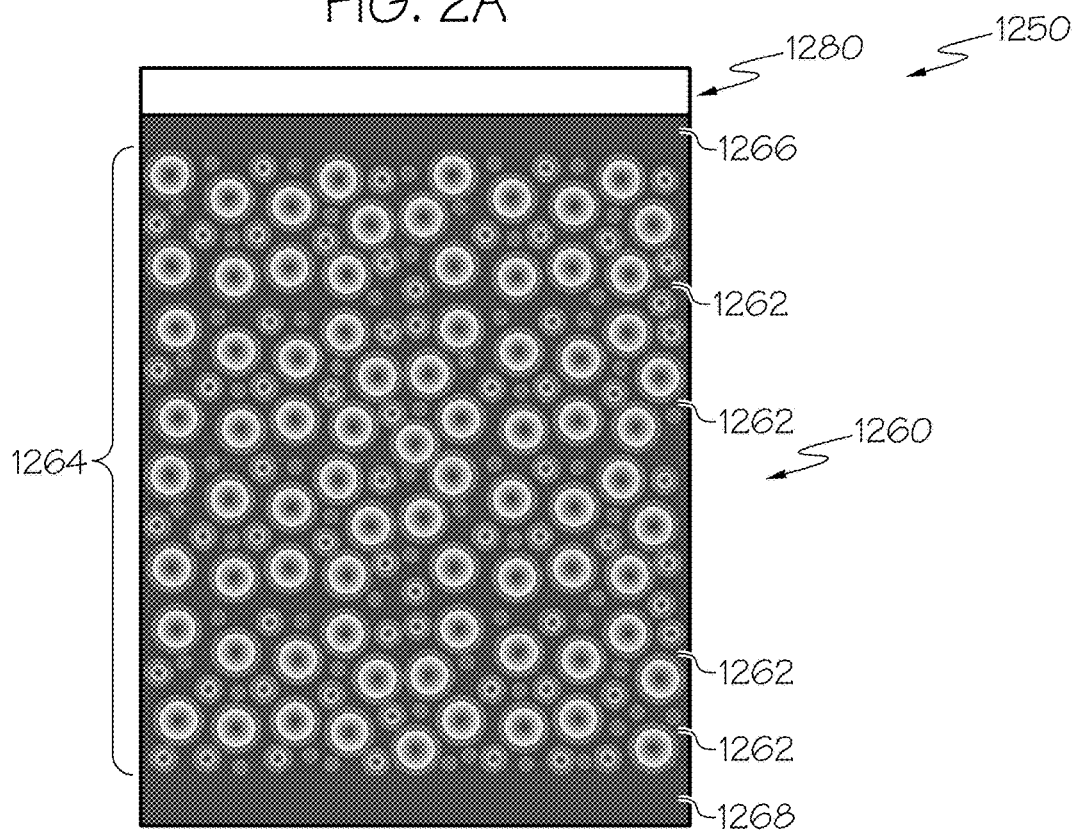
FIG. 2B is a cross-sectional view of a non-graded multilayered composite joined to a graded single-layer structure to form a graded multilayered material system.

Although the graded multilayered material system 1200 of FIG. 2A is formed using the graded multilayered composite 1100 of FIG. 1, it is conceivable that a graded multilayered material system be formed using a substantially uniform (i.e., non-graded) multilayered composite and a graded single-layer structure such as shown in FIG. 2B.

As shown in FIG. 2B, a multilayered material system 1250 comprises a non-graded multilayered composite 1260 (i.e., a substantially uniform multilayered composite) joined to a graded single-layered structure 1280. The non-graded multilayered composite 1260 comprises a metal matrix material 1262 having a non-graded layer 1264 of microspheres dispersed in the metal matrix material 1262. First and second buffer regions 1266, 1268 are disposed on opposite sides of the non-graded layer 1264 of microspheres. The graded single-layered structure 1280 is joined to the first buffer region 1266.

In some examples, the non-graded multilayered composite 1260 comprises a substantially uniform composition of the metal matrix material 1262. In some examples, the graded single-layered structure 1280 is selected from a monolithic or graded metallic liner (e.g., a metal, metal alloy, metal matrix composite, intermetallic alloy, intermetallic matrix composite, complex concentrated alloy, or complex concentrated matrix composite), a monolithic or graded ceramic liner (e.g., ceramic, ceramic matrix composite, or complex concentrated ceramic alloy), or a monolithic or graded metallic-ceramic hybrid liner, a graded metallic core, a graded cooling channel structure (which defines one or more cooling channels), and a graded environmental barrier coating.

Figure 3A:
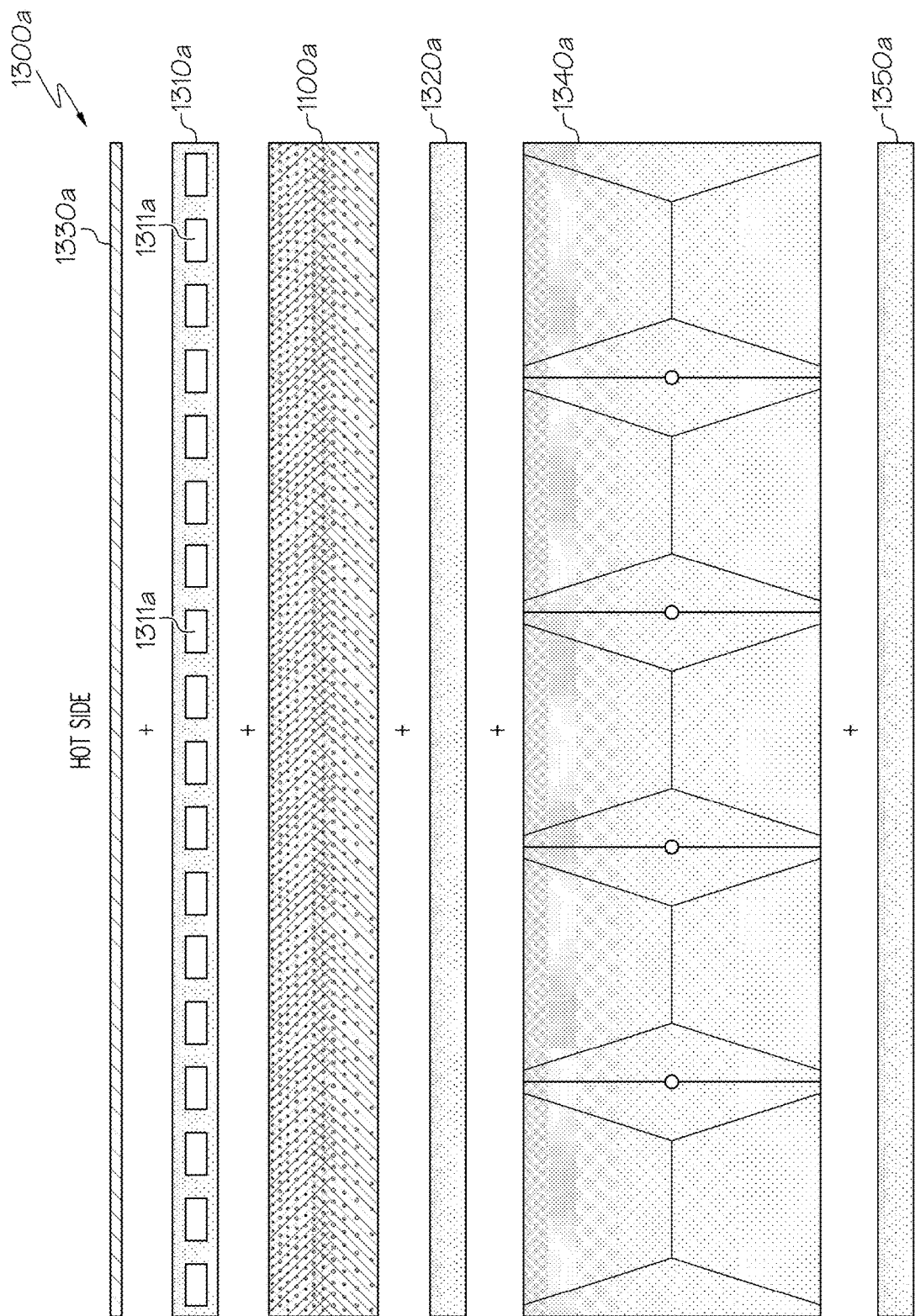
FIG. 3A is a cross-sectional view of the graded multilayered composite of FIG. 1 joined to a multiple-layer structure to form a graded multilayered material system.

FIG. 3A is a cross-sectional view of the graded multilayered composite 1100 of FIG. 1 joined to a multiple-layer structure to form a graded multilayered material system. Each of FIGS. 3B-3E is a cross-sectional view similar to FIG. 3A, and shows the graded multilayered composite 1100 of FIG. 1 joined to a different multiple-layer structure to provide a different graded multilayered material system. Each of the different multiple-layer structures may comprise a graded material structure.

Although each of the graded multilayered material systems of FIGS. 3A-3E is formed using the graded multilayered composite 1100 of FIG. 1, it is conceivable that a multilayered material system be formed using a substantially uniform (i.e., non-graded) multilayered composite. For purposes of explanation, each of the graded multilayered material systems of FIGS. 3A-3E will be described using the graded multilayered composite 1100 of FIG. 1.

As shown in graded multilayered material system 1300*a* of FIG. 3A, graded multilayered composite 1100*a* is sandwiched between cooling channel structure 1310*a* (which defines one or more cooling channels 1311*a*) and first liner sheet 1320*a*. This sandwiched structure, in turn, is sandwiched between environmental barrier coating 1330*a* and cellular core 1340*a*. Second liner sheet 1350*a* is disposed on opposite side of cellular core 1340*a*. Environmental barrier coating 1330*a* may comprise a monolithic or graded metallic material (e.g., a metal, metal alloy, metal matrix composite, intermetallic alloy, intermetallic matrix composite, complex concentrated alloy, or complex concentrated matrix composite), a monolithic or graded ceramic material (e.g., ceramic, ceramic matrix composite, or complex concentrated ceramic alloy), or a monolithic or graded metallic-ceramic hybrid material. This environmental barrier coating 1330*a* can be provided for oxidation resistance, corrosion resistance, wear resistance, emissivity increase, etc.

Figure 3B:
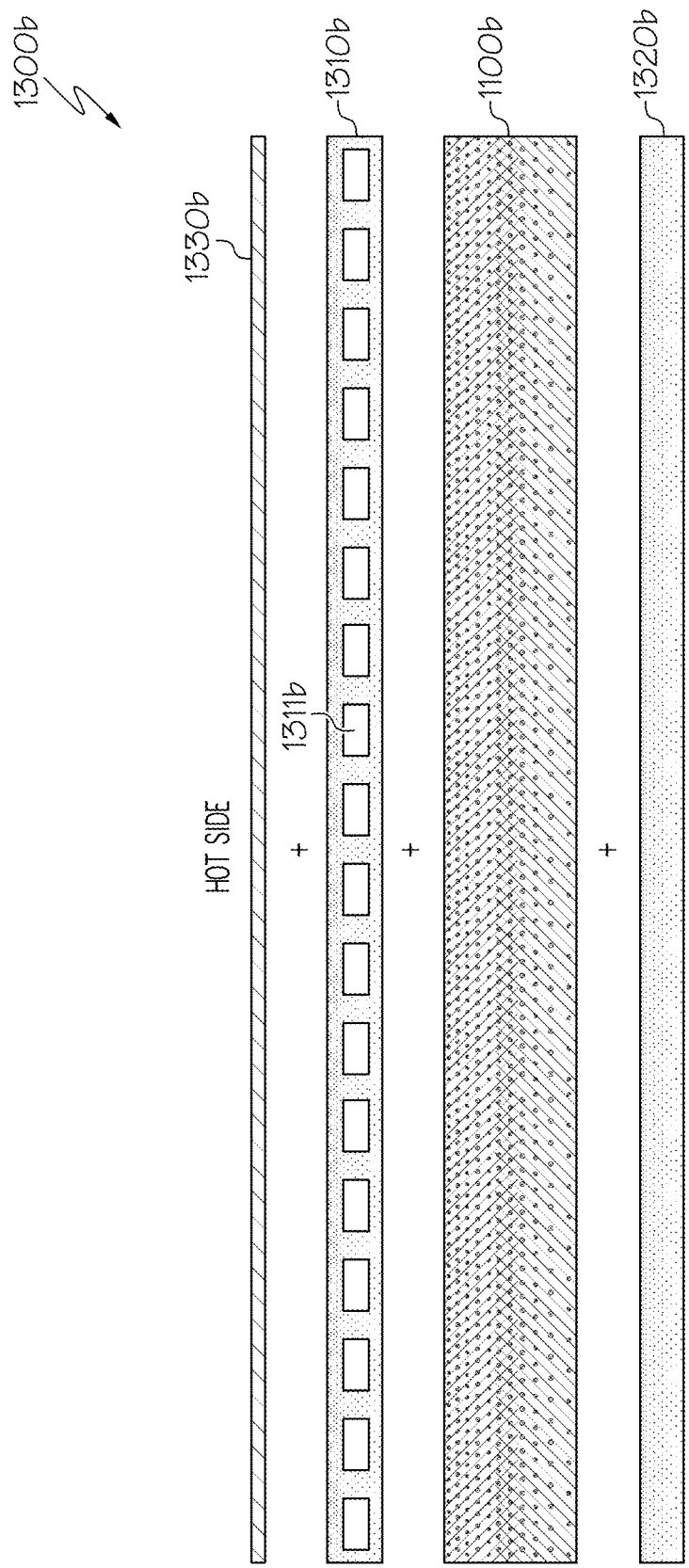
FIGS. 3B-3E are cross-sectional views similar to FIG. 3A, and show the graded multilayered composite of FIG. 1 joined to different multiple-layer structures to provide different graded multilayered material systems.

As shown in graded multilayered material system 1300*b* of FIG. 3B, graded multilayered composite 1100*b* is sandwiched between cooling channel structure 1310*b* (which defines one or more cooling channels 1311*b*) and first liner sheet 1320*b*. Environmental barrier coating 1330*b* is disposed on opposite side of cooling channel structure 1310*b*.

Figure 3C:
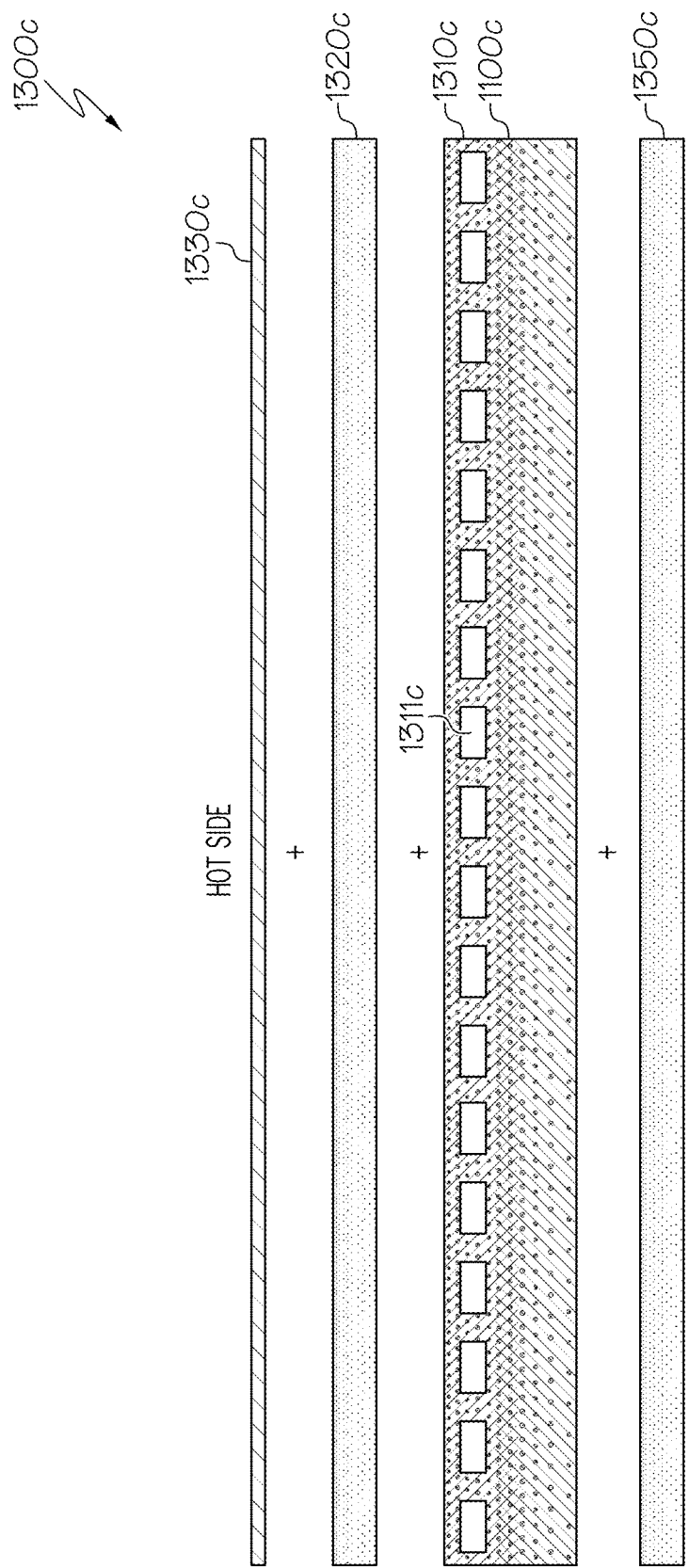

As shown in graded multilayered material system 1300*c* of FIG. 3C, graded multilayered composite 1100*c* is integrated with cooling channel structure 1310*c* (which defines one or more cooling channels 1311*c*). This integrated structure is sandwiched between first liner sheet 1320c and second liner sheet 1350c. The first and second liner sheets 1320c, 1350c may comprise a monolithic or graded metallic material (e.g., a metal, metal alloy, metal matrix composite, intermetallic alloy, intermetallic matrix composite, complex concentrated alloy, or complex concentrated matrix composite), a monolithic or graded ceramic material (e.g., ceramic, ceramic matrix composite, or complex concentrated ceramic alloy), or a monolithic or graded metallic-ceramic hybrid material. Environmental barrier coating 1330c is disposed on opposite side of first liner sheet 1320c.

Figure 3D:
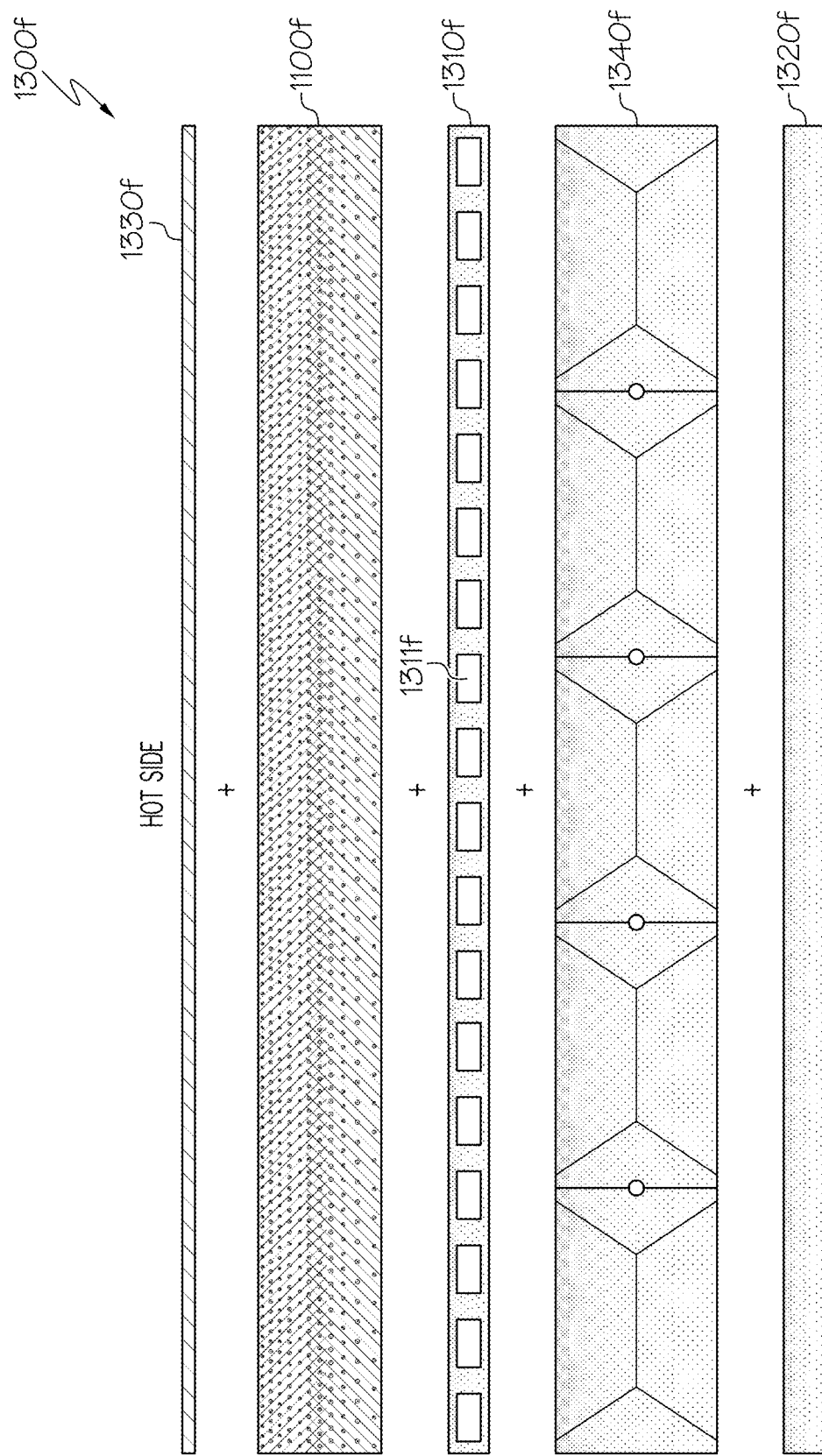

As shown in graded multilayered material system 1300f of FIG. 3D, graded multilayered composite 1100f is sandwiched between cooling channel structure 1310f (which defines one or more cooling channels 1311f) and environmental barrier coating 1330f. Cellular core 1340f is disposed on opposite side of cooling channel structure 1310f. Liner sheet 1320f is disposed on opposite side of cellular core 1340f.

Figure 3E:
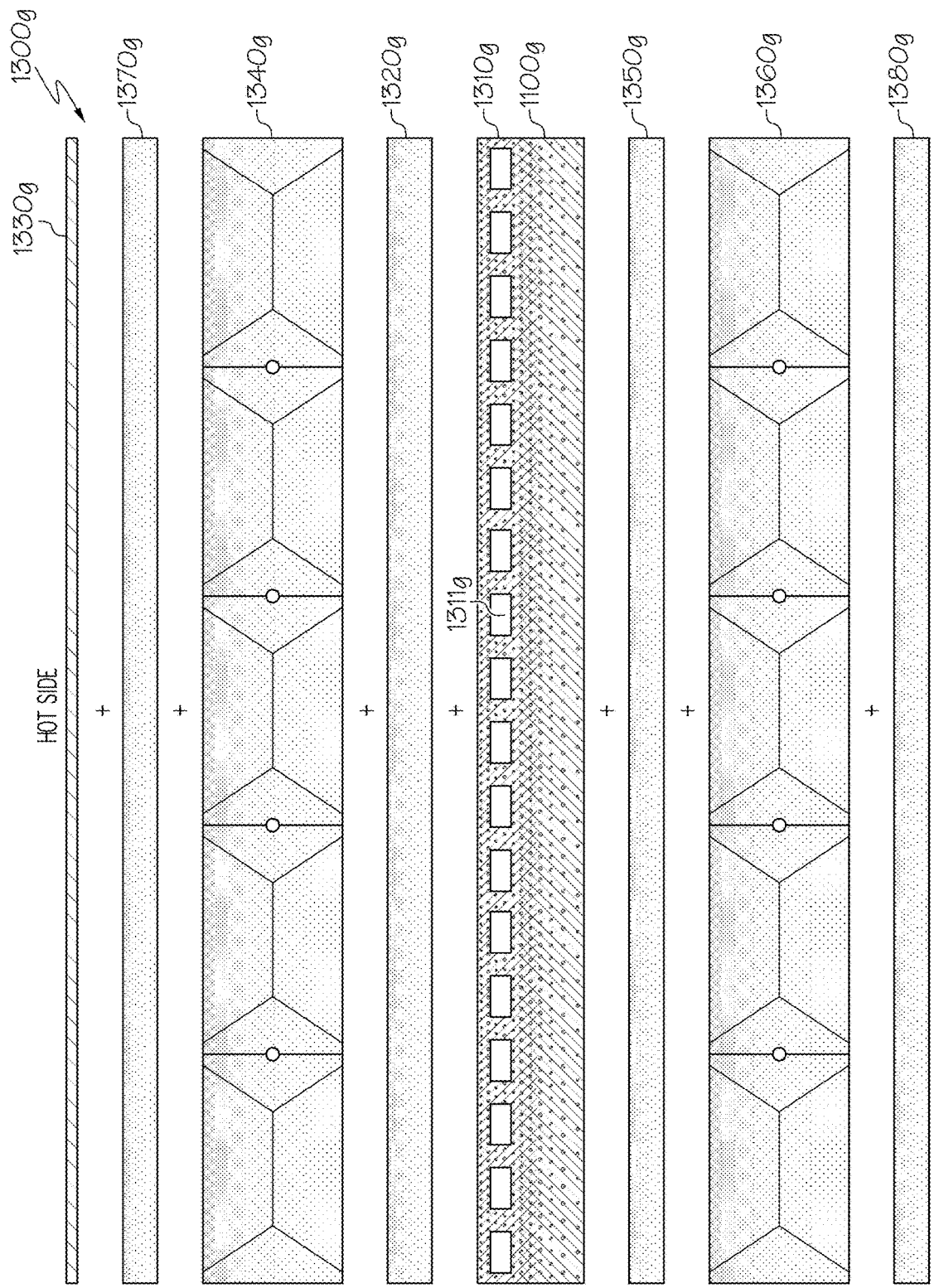

As shown in graded multilayered material system 1300g of FIG. 3E, graded multilayered composite 1100g is integrated with cooling channel structure 1310g (which defines one or more cooling channels 1311g). This integrated structure is sandwiched first liner sheet 1320g and second liner sheet 1350g. This sandwiched structure, in turn, is sandwiched between first cellular core 1340g and second cellular core 1360g. This sandwiched structure, in turn, is sandwiched between third liner sheet 1370g and fourth liner sheet 1380g. Environmental barrier coating 1330g is disposed on opposite side of third liner sheet 1370g.

In each of FIGS. 3A-3E, it is conceivable that any number individual elements and any combination of the elements may be used to provide a graded multilayered material system. Moreover, it is conceivable that the multilayered composite may be integrated with any element.

Figure 4:
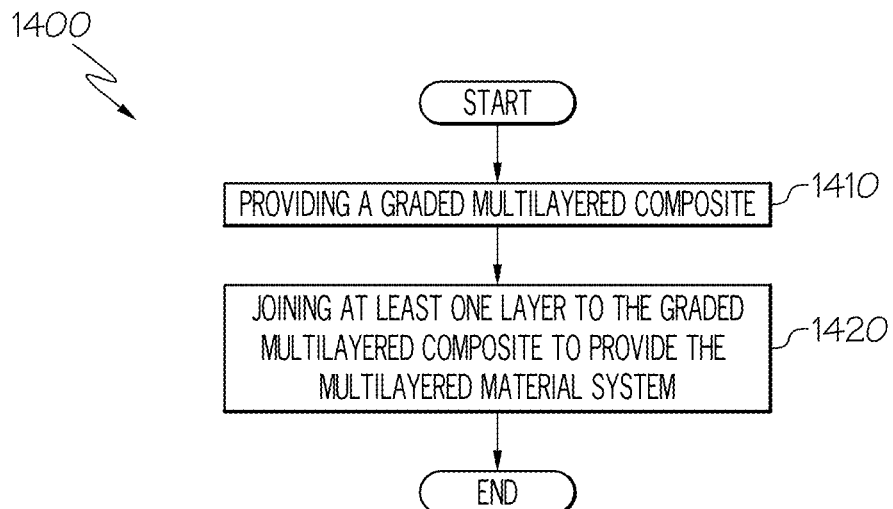
FIG. 4 is a flow diagram representing a method for manufacturing a multilayered material system.

Referring to FIG. 4, a flow diagram 1400 represents a method for manufacturing a multilayered material system. In block 1410, a graded multilayered composite is provided. The process proceeds to block 1420 in which at least one layer is joined to the graded multilayered composite to provide the multilayered material system. The process then ends.

In some examples, the at least one layer is selected from a monolithic or graded metallic liner (e.g., a metal, metal alloy, metal matrix composite, intermetallic alloy, intermetallic matrix composite, complex concentrated alloy, or complex concentrated matrix composite), a monolithic or graded ceramic liner (e.g., ceramic, ceramic matrix composite, or complex concentrated ceramic alloy), or a monolithic or graded metallic-ceramic hybrid liner, a monolithic or graded metallic core, a monolithic or graded cooling channel structure, or a monolithic or graded environmental barrier coating. For example, the monolithic or graded metallic liner comprises a metal, metal alloy, metal matrix composite, intermetallic alloy, intermetallic matrix composite, complex concentrated alloy, or complex concentrated matrix composite, and the monolithic or graded ceramic liner comprises ceramic, ceramic matrix composite, or complex concentrated ceramic alloy.

Figure 5:
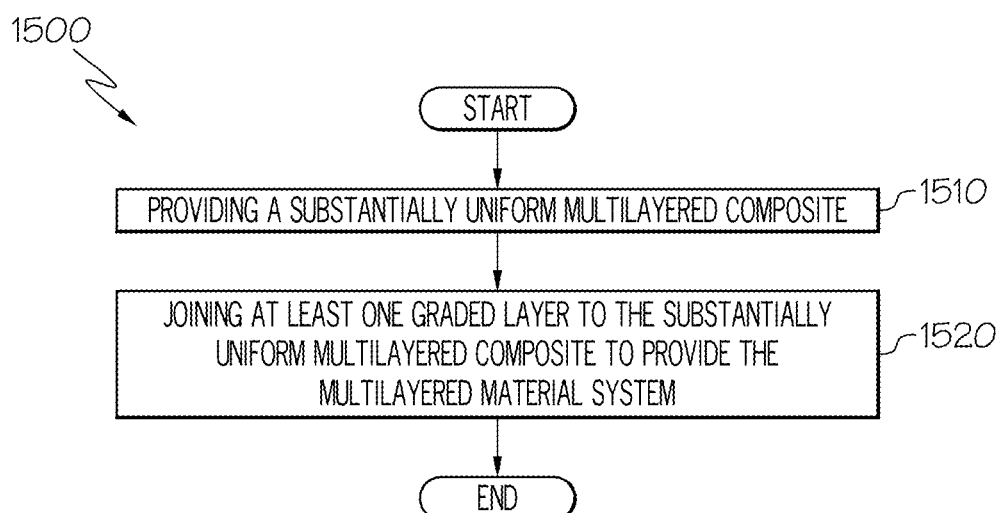
FIG. 5 is a flow diagram representing a method for manufacturing a multilayered material system.

Referring to FIG. 5, a flow diagram 1500 represents a method for manufacturing a tuned multilayered material system. In block 1510, a non-graded multilayered composite is provided. The process proceeds to block 1520 in which the at least one monolithic or graded layer is joined to the non-graded multilayered composite to provide the tuned multilayered material system. The process then ends.

In some examples, the at least one graded layer is selected from a graded metal liner, a graded ceramic liner, a graded metal-ceramic hybrid liner, a graded metallic core, a graded cooling channel structure, and a graded environmental barrier coating. For example, the monolithic or graded metallic liner comprises a metal, metal alloy, metal matrix composite, intermetallic alloy, intermetallic matrix composite, complex concentrated alloy, or complex concentrated matrix composite, and the monolithic or graded ceramic liner comprises ceramic, ceramic matrix composite, or complex concentrated ceramic alloy.

Figure 6:
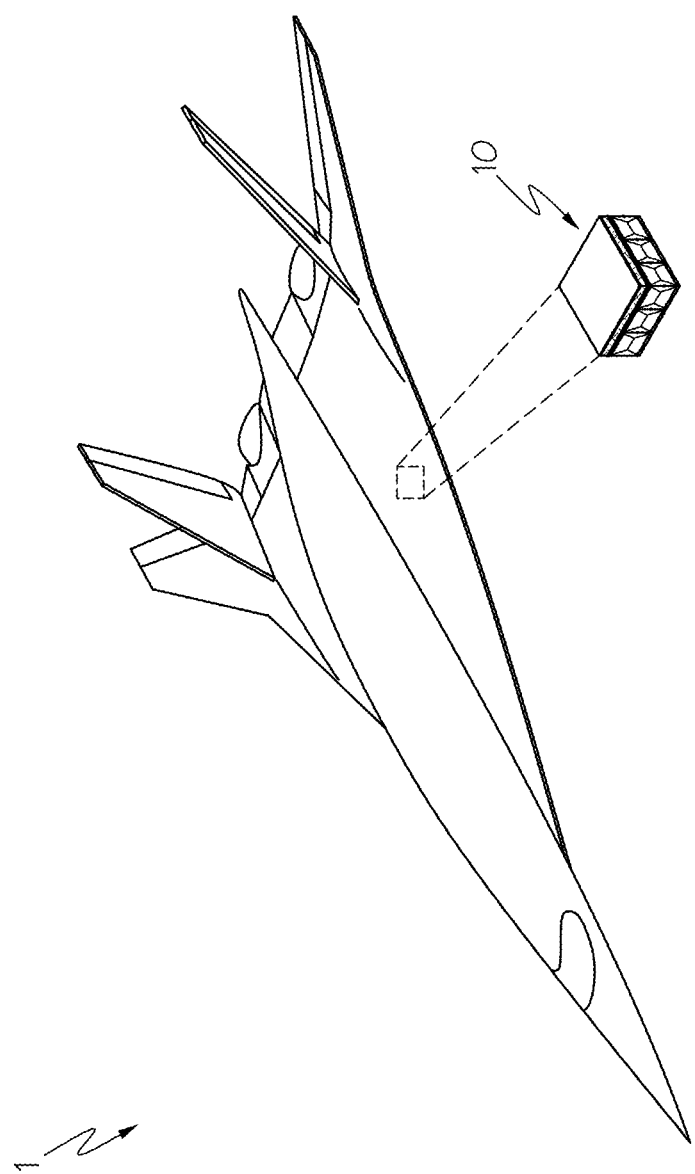
FIG. 6 is a perspective view of a vehicle that includes a multilayered material system including a cellular sandwich panel and a multilayered composite joined to the cellular sandwich panel according to the present description.

FIG. 6 is a perspective view of a structure 1 that includes a multilayered material system 10 according to the present description. The structure 1 is shown as an aircraft, such as a hypersonic aircraft, but the structure 1 is not limited to vehicles and can include, for example, weapons, such as hypersonic weapons. The multilayered material system 10 can form an exterior surface of the structure 1 and can function as a thermal protection system for the structure 1. It can also serve as other acreage skin structure, engine inlet structure, leading edge structure, control surface structure, thermo-mechanical isolator structure, or integrated thermal protection system for internal cold components.

Figure 7:
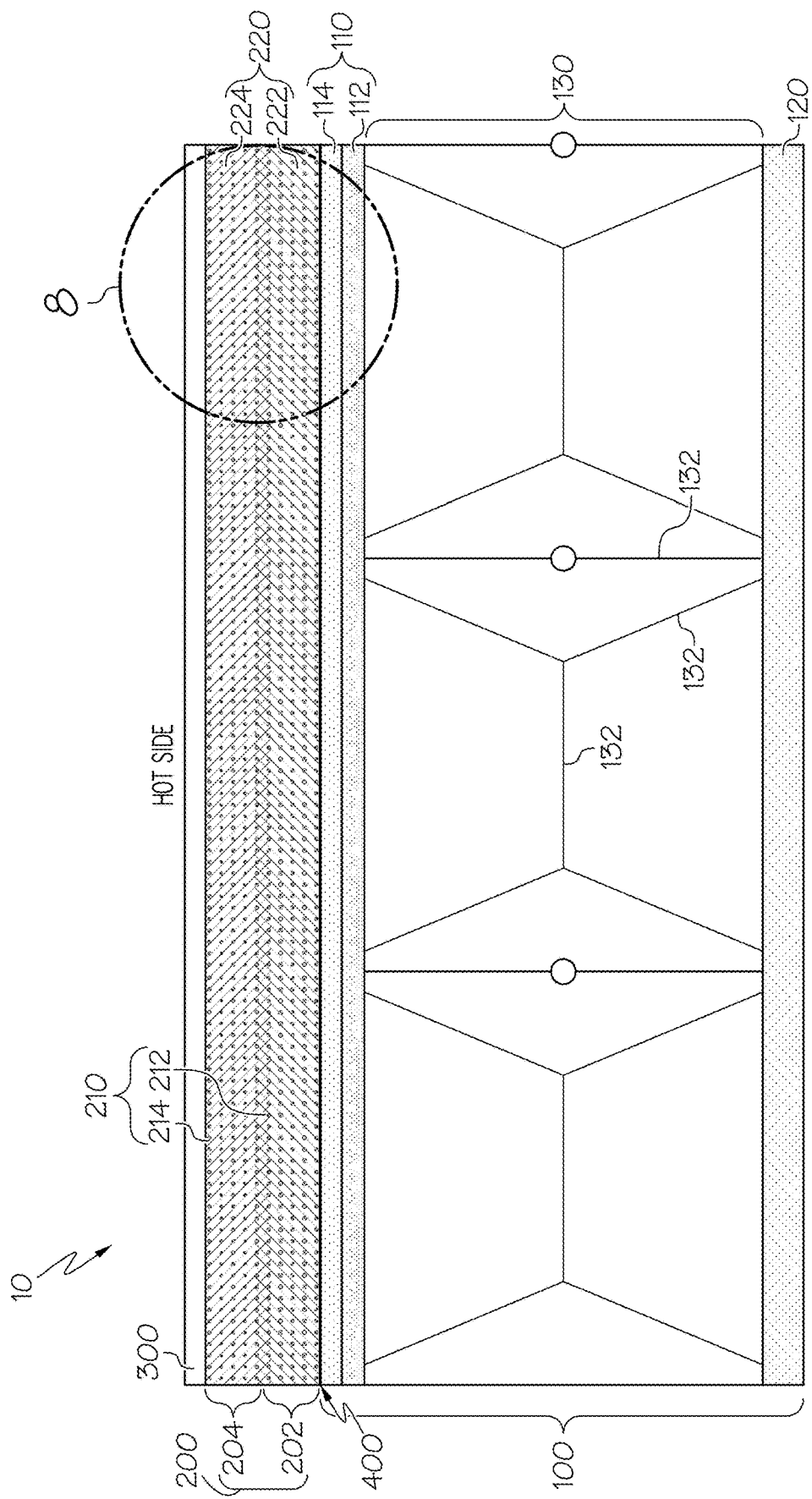
FIG. 7 is a cross-sectional view of an example of the multilayered material system of FIG. 6.
Figure 8:
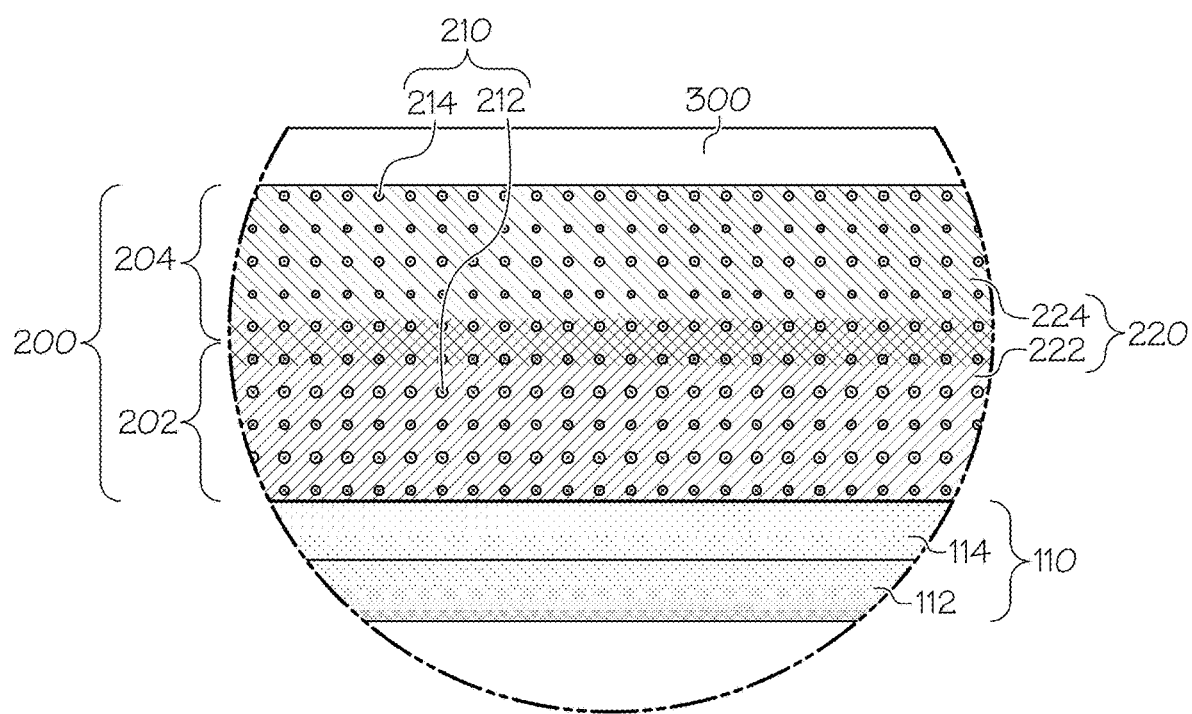
FIG. 8 is a zoomed-in cross-sectional view of a portion of the multilayered material system of FIG. 7.

FIG. 7 is a cross-sectional view of an example of the multilayered material system 10 of FIG. 6, and FIG. 8 is a zoomed-in cross-sectional view of a portion of the multilayered material system of FIG. 7. As shown in FIGS. 7 and 8, the tuned multilayered material system 10 includes a cellular sandwich panel 100 and a multilayered composite 200 joined to the cellular sandwich panel 100, in which the multilayered composite 200 includes hollow microspheres 210 dispersed within a metallic matrix material 220.

Figure 9:
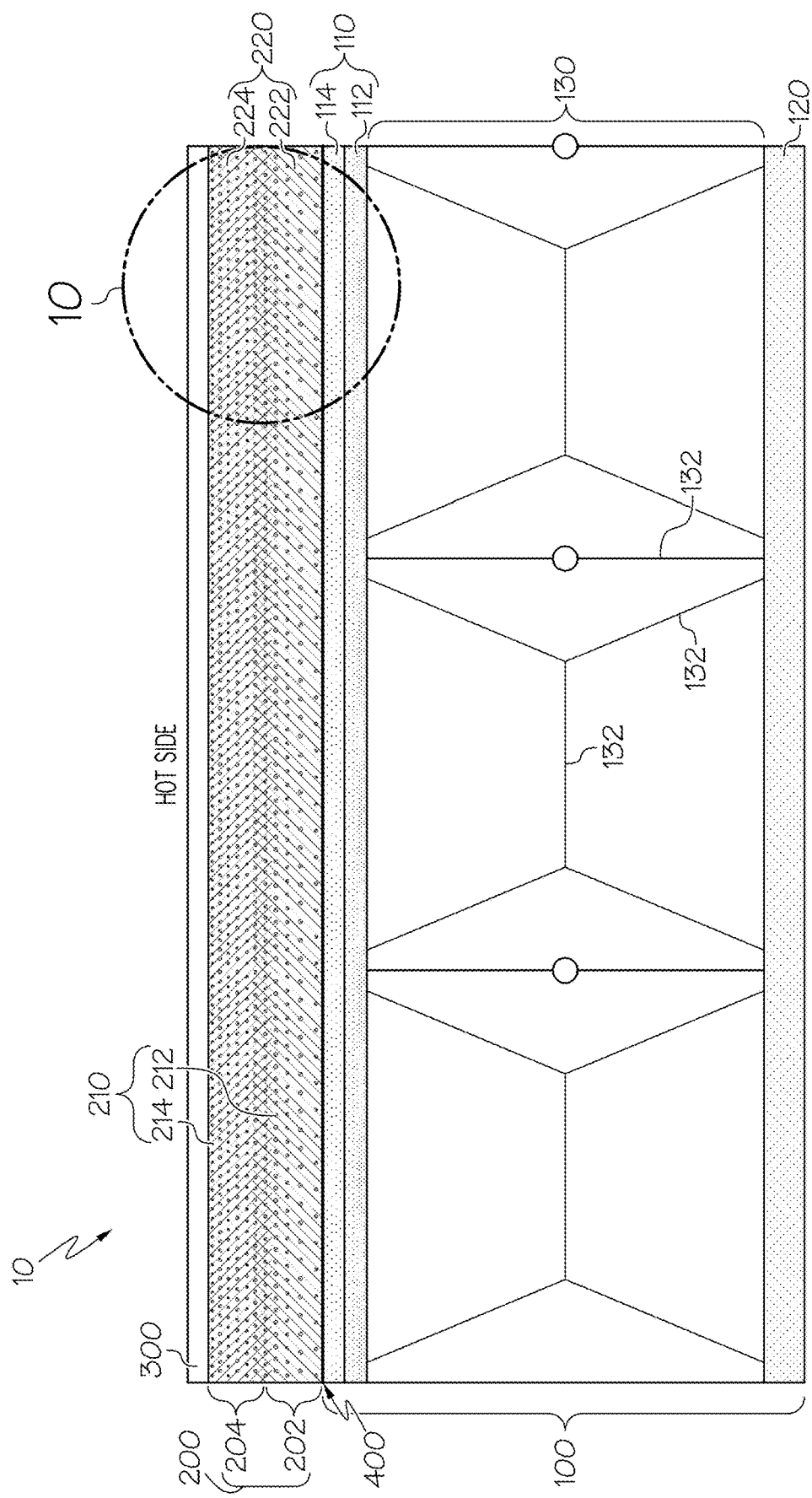
FIG. 9 is a cross-sectional view of another example of the multilayered material system of FIG. 6.
Figure 10:
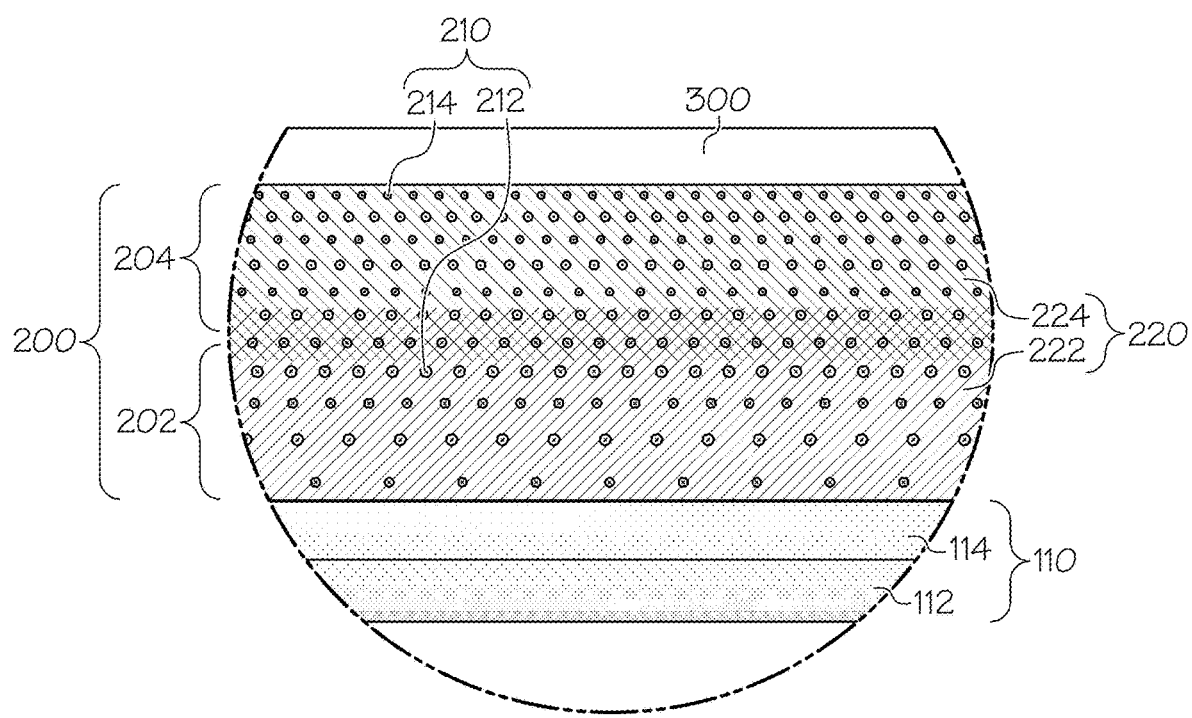
FIG. 10 is a zoomed-in cross-sectional view of a portion of the multilayered material system of FIG. 9.

FIG. 9 is a cross-sectional view of another example of the multilayered material system 10 of FIG. 6, and FIG. 10 is a zoomed-in cross-sectional view of a portion of the tuned multilayered material system of FIG. 9. As shown in FIGS. 9 and 10, the multilayered material system 10 includes a cellular sandwich panel 100 and a multilayered composite 200 joined to the cellular sandwich panel 100, in which the multilayered composite 200 includes a spatial distribution of hollow microspheres 210 dispersed within a metallic matrix material 220.

The multilayered material systems 10 of FIGS. 7 to 10 enable for the design of multifunctional and tunable structures that combine exceptional stiffness and strength-to-weight ratio with additional functional enhancements such as thermal protection and thermal management. The multilayered material system 10 includes two main constituents. First the cellular sandwich panel 100 can be optimized and tuned to meet specific extreme environment application requirements. Second, the multilayered composite 200 can be optimized and tuned to meet thermomechanical loading profile requirements. Further, the cellular sandwich panel 100 and the multilayered composite 200 can be joined together by a variety of methods to meet thermomechanical loading requirements.

In an example, the cellular sandwich panel 100 includes a first liner sheet 110, a second liner sheet 120, and a cellular core 130 between the first liner sheet 110 and the second liner sheet 120. The thickness of the cellular core 130 is typically greater than the thickness of the first liner sheet 110 and second liner sheet 120 and the density of the cellular core 130 is typically less than the density of the first liner sheet 110 and second liner sheet 120. The stiffness of the first liner sheet 110 and second liner sheet 120 is typically greater than the stiffness of the cellular core 130. By attaching the thinner but stiffer first liner sheet 110 and second liner sheet 120 to the lightweight by thicker cellular core 130, the cellular sandwich panel 100 is provided with high stiffness and low overall density.

The first liner sheet 110 can be formed from a variety of alloys, including but not limited to aluminum and aluminum alloys/metal matrix composites; titanium and titanium alloys/metal matrix composites; superalloys (including iron and iron alloys/metal matrix composites, nickel and nickel alloys/metal matrix composites, cobalt and cobalt alloys/metal matrix composites); refractory metals and alloys/metal matrix composites; copper and copper alloys/metal matrix composites; precious metals and alloys/metal matrix composites; zirconium and hafnium and their alloys/metal matrix composites; intermetallics; complex concentrated alloys/metal matrix composites (high entropy alloys/metal matrix composites, medium entropy alloys/metal matrix composites, multicomponent alloys/metal matrix composites). In an example, the first liner sheet 110 is formed from a titanium alloy. The first liner sheet 110 can be optimized and tuned to have a variety of thicknesses.

The second liner sheet 120 can be formed from a variety of alloys, including but not limited to aluminum and aluminum alloys/metal matrix composites; titanium and titanium alloys/metal matrix composites; superalloys (including iron and iron alloys/metal matrix composites, nickel and nickel alloys/metal matrix composites, cobalt and cobalt alloys/metal matrix composites); refractory metals and alloys/metal matrix composites; copper and copper alloys/metal matrix composites; precious metals and alloys/metal matrix composites; zirconium and hafnium and their alloys/metal matrix composites; intermetallics; complex concentrated alloys/metal matrix composites (high entropy alloys/metal matrix composites, medium entropy alloys/metal matrix composites, multicomponent alloys/metal matrix composites). In an example, the second liner sheet 120 is formed from a titanium alloy. The second liner sheet 120 can be optimized and tuned to have a variety of thicknesses.

The cellular core 130 can be formed from a variety of alloys, including but not limited to aluminum and aluminum alloys/metal matrix composites; titanium and titanium alloys/metal matrix composites; superalloys (including iron and iron alloys/metal matrix composites, nickel and nickel alloys/metal matrix composites, cobalt and cobalt alloys/metal matrix composites); refractory metals and alloys/metal matrix composites; copper and copper alloys/metal matrix composites; precious metals and alloys/metal matrix composites; zirconium and hafnium and their alloys/metal matrix composites; intermetallics; complex concentrated alloys/metal matrix composites (high entropy alloys/metal matrix composites, medium entropy alloys/metal matrix composites, multicomponent alloys/metal matrix composites). In an example, the cellular core 130 is formed from a titanium alloy. The cellular core 130 can be optimized and tuned to have a variety of thicknesses.

The cellular core 130 can be produced using a variety of additive manufacturing technologies, including melting processes, such as powder bed fusion or directed energy deposition; sintering processes, such as binder jetting, material extrusion, and material jetting; and solid state processes, such as additive friction stir processing, ultrasonic additive processing, cold spray, etc.

The cellular core 130 can have a variety of architectures. In an example, cellular core 130 can have an open cellular architecture. In another example, the cellular core 130 can have a closed cellular architecture. In another example, the cellular core 130 can have a honeycomb architecture. The architecture of the cellular core 130 can be tuned and optimized to meet application requirements.

The cellular core 130 can be bonded to the first liner sheet 110 and second liner sheet 120 by a variety of methods, such as by welding, brazing, fastening, diffusion bonding (with or without interlayer foils/coatings) or additive manufacturing.

In an example, the cellular core 130 includes one or more third liner sheets. In another example, the cellular core 130 includes one or more third liner sheets 132 that are superplastically formed and are diffusion bonded to the first liner sheet 110 and the second liner sheet 120. Superplastic forming and diffusion bonding (SPF/DB) is a technique for forming complex-shaped hollow cellular sandwich panels. It combines superplastic forming with diffusion bonding to create the cellular sandwich panels. Typically, three or more liner sheets are welded together at their edges, then heated within the confines of a female mold tool. At high temperatures, the three or more liner sheets become extremely malleable, i.e. superplastic. When in the superplastic state, an inert gas is injected between the three or more liner sheets to form the three or more liner sheets to the shape of the mold. Superplastic forming and diffusion bonding is useful for complex shapes. Thus, the architecture of the one or more third liner sheets 132 of the cellular core 130 can be tuned and optimized to meet a wide variety of application requirements. In the illustrated example, the cellular core 130 includes a double core structure having two third liner sheets 132.

The cellular sandwich panel 100 can provide a thermal protection gradient functionality. In an example, the melting point or thermal microstructural stability point of the first liner sheet 110 is greater than the melting point or thermal microstructural stability point of the second liner sheet 120. In another example, the melting point or thermal microstructural stability point of the first liner sheet 110 is greater than the melting point or thermal microstructural stability point of the cellular core 130. In yet another example, the melting point or thermal microstructural stability point of the cellular core 130 is greater than the melting point or thermal microstructural stability point of the second liner sheet 120. In yet another example, the melting point or thermal microstructural stability point of the first liner sheet 110 is greater than the melting point or thermal microstructural stability point of the cellular core 130, which is greater than the melting point or thermal microstructural stability point of the second liner sheet 120. By way of providing the above-described thermal protection gradient functionality, the cellular sandwich panel 100 has a hot side with higher resistance to high temperatures and a cold side with lower resistance to high temperatures.

In addition, by relaxing the requirements for high resistance to high temperatures at the cold side, the cold side can be formed from materials having lower cost or superior properties, such as increased strength, increased damage tolerance, increased resistance to environmentally assisted cracking, increased formability, increased joinability or increased producibility, than the materials at the hot side. Accordingly, by way of example, the strength, damage tolerance, resistance to environmentally assisted cracking, formability, joinability or producibility of the second liner sheet 120 is greater than the strength, damage tolerance, resistance to environmentally assisted cracking, formability, joinability or producibility of the first liner sheet 110. In another example, the strength, damage tolerance, resistance to environmentally assisted cracking, formability, joinability or producibility of the second liner sheet 120 is greater than the strength, damage tolerance, resistance to environmentally assisted cracking, formability, joinability or producibility of the cellular core 130. In yet another example, the strength, damage tolerance, resistance to environmentally assisted cracking, formability, joinability or producibility of the cellular core 130 is greater than the strength, damage tolerance, resistance to environmentally assisted cracking, formability, joinability or producibility of the first liner sheet 110. In yet another example, the strength, damage tolerance, resistance to environmentally assisted cracking, formability, joinability or producibility of the second liner sheet 120 is greater than the strength, damage tolerance, resistance to environmentally assisted cracking, formability, joinability or producibility of the cellular core 130, which is greater than the strength, damage tolerance, resistance to environmentally assisted cracking, formability, joinability or producibility of the first liner sheet 110. By way of providing the above-described thermal protection gradient functionality, the cellular sandwich panel 100 can have a hot side with higher resistance to high temperatures but lower strength, damage tolerance, resistance to environmentally assisted cracking, formability, joinability or producibility and a cold side with lower resistance to high temperatures but higher strength, damage tolerance, resistance to environmentally assisted cracking, formability, joinability or producibility.

The first liner sheet 110 can include a first liner layer 112 proximate to the cellular core 130 and a second liner layer 114 proximate to the multilayered composite 200. The first liner layer 112 and the second liner layer 114 can provide a thermal protection gradient functionality. In an example, a melting point or thermal microstructural stability point of the second liner layer 114 is greater than a melting point or thermal microstructural stability point of the first liner layer 112. The first liner sheet 110 can further include third or further liner layers intermediate to the first liner layer 112 and the second liner layer 114, which the third or further liner layers have a melting point or thermal microstructural stability points intermediate to the first liner layer 112 and the second liner layer 114. By way of providing the above-described thermal protection gradient functionality of the first liner sheet 110, the first liner sheet 110 has a hot side with higher resistance to high temperatures and a cold side with lower resistance to high temperatures.

The first liner sheet 110 can provide for a compatibility with the multilayered composite 200. In an aspect, the first liner layer 112 is compatible with the second liner layer 114, which is compatible with the multilayered composite 200, but the first liner layer 112 is incompatible or less compatible with the multilayered composite 200. The first liner sheet 110 can further include third or further liner layers intermediate to the first liner layer 112 and the second liner layer 114, in which the third or further liner layers are compatible with the first liner layer 112 and the second liner layer 114 but the first liner layer 112 and second liner layer 114 are incompatible or less compatible with each other.

In an example, a composition of the first liner layer 112 includes an element that is detrimental to the properties of the multilayered composite 200, or a composition of the multilayered composite 200 includes an element that is detrimental the properties of the first liner layer 112, and the second liner layer 114 excludes the detrimental element. Accordingly, the first liner sheet 110 can provide for an improved compatibility of the cellular sandwich panel 100 with the multilayered composite 200.

In another example, a temperature for processing the multilayered composite 200 exceeds the melting point or thermal microstructural stability point of the first liner layer 112 rendering the first liner layer 112 and the multilayered composite 200 incompatible, and the melting point or thermal microstructural stability point of the second liner layer 114 exceeds the temperature for processing the multilayered composite 200 rending the second liner layer 114 and the multilayered composite 200 more compatible. The temperature for processing the multilayered composite 200 can include, for example, a joining temperature, a sintering temperature, or a heat treatment temperature. Accordingly, the first liner sheet 110 can provide for an improved compatibility of the cellular sandwich panel 100 with the multilayered composite 200.

In yet another example, a coefficient of thermal expansion of the first liner layer 112 greatly varies from a coefficient of thermal expansion of the multilayered composite 200 and a coefficient of thermal expansion the second liner layer 114 varies less from the coefficient of thermal expansion of the multilayered composite 200. Accordingly, the first liner sheet 110 can provide for an improved compatibility of the cellular sandwich panel 100 with the multilayered composite 200.

In addition, the first liner layer 112 can be formed from alloys having lower cost or superior properties, such as increased strength, damage tolerance, resistance to environmentally assisted cracking, formability, joinability or producibility. Accordingly, by way of example, the strength, damage tolerance, resistance to environmentally assisted cracking, formability, joinability or producibility of the first liner layer 112 is greater than the strength, damage tolerance, resistance to environmentally assisted cracking, formability, joinability or producibility of the second liner layer 114. Thus, by providing the above-described compatibility of the cellular sandwich panel 100 with the multilayered composite 200, the cellular sandwich panel 100 can be provided with a higher overall strength, damage tolerance, resistance to environmentally assisted cracking, formability, joinability or producibility while remaining compatible with the multilayered composite 200.

As previously mentioned, the multilayered composite 200 includes hollow microspheres 210 dispersed within a metallic matrix material 220. The hollow microspheres 210 can provide the multilayered composite 200 with lightweight characteristics and insulative, conductive, and/or noise/impact attenuating properties. The metallic matrix material 220 can provide the multilayered composite 200 with durability and resistance to failure.

The metallic matrix material 220 can be formed from a variety of materials. In an example, the metallic matrix material 220 is formed from at least one of an alloy material, including but not limited to aluminum and aluminum alloys/metal matrix composites; titanium and titanium alloys/metal matrix composites; superalloys (including iron and iron alloys/metal matrix composites, nickel and nickel alloys/metal matrix composites, cobalt and cobalt alloys/metal matrix composites); refractory metals and alloys/metal matrix composites; copper and copper alloys/metal matrix composites; precious metals and alloys/metal matrix composites; zirconium and hafnium and their alloys/metal matrix composites; intermetallics; complex concentrated alloys/metal matrix composites (high entropy alloys/metal matrix composites, medium entropy alloys/metal matrix composites, multicomponent alloys/metal matrix composites) and a ceramic material. By forming the metallic matrix material 220 from at least one of an alloy material and a ceramic material, the metallic matrix material 220 can be provided with resistance to high temperatures. In a specific example, the metallic matrix material 220 is formed from a nickel-based superalloy. In another specific example, the metallic matrix material is formed from a titanium-based superalloy.

The hollow microspheres 210 can be formed from a variety of materials. In an example, the hollow microspheres 210 are formed from a ceramic material. By forming the hollow microspheres 210 from a ceramic material, the hollow microspheres 210 can be provided with resistance to high temperatures and resistance against deformation to maintain their shape around the hollow interior thereof. In a specific example, the ceramic material is formed from yttria-stabilized zirconia or alumina-silica-iron glass. The architecture of the hollow microspheres 210 can be tuned and optimized to enable the multilayered composite 200 to meet application requirements. This architecture includes material, coating size, shell thickness, coating thickness, and type/material. In some implementations, the material of the hollow microspheres 210 is ceramic-based or metallic-based, and the size range is between 5 microns and 500 microns in diameter with average wall thickness between 2% to 30% of the diameter. In some implementations, the hollow microspheres 210 are coated with a coating made of metallic, ceramic, or hybrid metal-ceramic material combinations and having a coating thickness between 2 microns and 200 microns. The microspheres can also be solid. These example implementations tune the multilayered composite 200 for a particular application.

In an example, the hollow microspheres 210 are included in the metallic matrix material 220 in a volume fraction in a range of between about 1 and 60 percent. Volume fraction of the hollow microspheres 210 is defined as the volume of all the hollow microspheres 210 within the metallic matrix material 220 divided by the total volume of the hollow microspheres 210 and the metallic matrix material 220. A higher volume fraction of hollow microspheres 210 increases lightweight characteristics and insulative, conductive, and/or noise/impact attenuating properties of the multilayered composite 200. A lower volume fraction of hollow microspheres 210 increases durability and resistance to failure of the multilayered composite 200.

In an example, the multilayered composite 200 includes a first layer 202 proximate to the first liner sheet 110 and a second layer 204 adjacent to first layer 202. The first layer 202 has a first matrix 222 that includes first hollow microspheres 212, and the second layer 204 has a second matrix 224 that includes second hollow microspheres 214.

The first layer 202 and second layer 204 can provide a thermal protection gradient functionality. In an example, a melting point or thermal microstructural stability point of the second matrix 224 is greater than a melting point or thermal microstructural stability point of the first matrix 222. The multilayered composite 200 can further include third or further layers intermediate to the first layer 202 and the second layer 204, in which the third or further layers have matrixes with melting point or thermal microstructural stability points that are intermediate to the melting point or thermal microstructural stability points of the first matrix 222 and second matrix 224. By way of providing the above-described thermal protection gradient functionality of the multilayered composite 200, the multilayered composite 200 has a hot side with higher resistance to high temperatures and a cold side with lower resistance to high temperatures.

The multilayered composite 200 can provide for a compatibility with the cellular sandwich panel 100. In an example, the first matrix 222 is compatible with the second liner layer 114 of the cellular sandwich panel 100, but the second matrix 224 is incompatible or less compatible with the second liner layer 114 of the cellular sandwich panel 100. The multilayered composite 200 can further include third or further layers intermediate to the first layer 202 and the second layer 204, in which the third or further layers are compatible with the first layer 202 and the second layer 204 but the first layer 202 and second layer 204 are incompatible or less compatible with each other.

In an example, a composition of the second matrix 224 includes an element that is detrimental to the properties of the second liner layer 114, or a composition of the second liner layer 114 includes an element that is detrimental the properties of the second matrix 224, and the second matrix 224 excludes the detrimental element. Accordingly, the multilayered composite 200 can provide for an improved compatibility with the cellular sandwich panel 100.

In another example, a temperature for processing the second matrix 224 exceeds the melting point or thermal microstructural stability point of the second liner layer 114 rendering the second matrix 224 and the second liner layer 114 incompatible, and the melting point or thermal microstructural stability point of the second liner layer 114 exceeds a temperature for processing the first matrix 222 rendering the first matrix 222 and the second liner layer 114 more compatible. The temperature for processing the first matrix 222 and the second matrix 224 can include, for example, a joining temperature, a sintering temperature, or a heat treatment temperature. Accordingly, the multilayered composite 200 can provide for an improved compatibility with the cellular sandwich panel 100.

In yet another example, a coefficient of thermal expansion of the second layer 204 greatly varies from a coefficient of thermal expansion of the second liner layer 114 and a coefficient of thermal expansion of the first layer 202 varies less from the coefficient of thermal expansion of the second liner layer 114. Accordingly, the multilayered composite 200 can provide for an improved compatibility with the cellular sandwich panel 100.

In addition, the second matrix 224 can be formed from materials having lower cost or superior properties, such as higher resistance to high temperatures. Accordingly, by way of example, the melting point or thermal microstructural stability point of the second matrix 224 is greater than the melting point or thermal microstructural stability point of the first matrix 222. Thus, by providing the above-described compatibility of the multilayered composite 200 with the cellular sandwich panel 100, the multilayered composite 200 can be provided with a higher resistance to high temperatures while remaining compatible with the cellular sandwich panel 100.

As shown in FIGS. 9 and 10, the first layer 202 and the second layer 204 provide a spatial distribution of the hollow microspheres 210. Although FIGS. 9 and 10 show the first layer 202 and the second layer 204 providing a graded spatial distribution of the hollow microspheres 210, it is conceivable that the first layer 202 and the second layer 204 provide a substantially uniform (i.e., non-graded) spatial distribution of the hollow microspheres 210. For the purpose of explanation, only the graded spatial distribution of the hollow microspheres 210 will be described herein.

As illustrated in FIGS. 9 and 10, a volume fraction of the second hollow microspheres 214 within the second layer 204 is higher than a volume fraction of the first hollow microspheres 212 within the first layer 202. By way of example, the volume fraction of the second hollow microspheres 214 within the second layer 204 is at least 5 percent greater than the volume fraction of the first hollow microspheres 212 within the first layer 202, preferably at least 10 percent greater, more preferably at least 20 percent greater, even more preferably at least 50 percent greater, even more preferably at least 100 percent greater. Accordingly, the first layer 202 can have a higher durability and resistance to failure while the second layer 204 can have a lower overall density and higher insulative, conductive, and/or noise/impact attenuating properties. Additionally, the first layer 202 having a lower volume fraction of first hollow microspheres 212 can be more compatible for joining with the second liner layer 114 than the second layer 204 having a higher volume fraction of second hollow microspheres 214. By way of a specific example, the first layer 202 has a volume fraction of about 10% first hollow microspheres 212, and the second layer 204 has a volume fraction of about 45% second hollow microspheres 214. The first liner sheet 110 can further include third or further liner layers intermediate to the first liner layer 112 and the second liner layer 114, which the third or further liner layers have a melting point or thermal microstructural stability points intermediate to the first liner layer 112 and the second liner layer 114. The multilayered composite 200 can further include third or further layers intermediate to the first layer 202 and the second layer 204, in which the third or further layers having third or further hollow microspheres having different volume fractions of hollow microspheres.

Although FIGS. 9 and 10 show the first layer 202 and second layer 204 as generally planar layers, in which the first layer 202 covers the surface of the cellular sandwich panel 100 and the second layer 204 covers the surface of the first layer 202, other arrangements of the first layer 202 and second layer 204 are included in the present description. For example, the first layer 202 and second layer 204 each cover adjacent portions of the cellular sandwich panel 100. Accordingly, the first layer 202 can be more compatible for fastening with the second liner layer 114 of the cellular sandwich panel 100 than the second layer 204. Thus, the first layer 202 can be positioned on the second liner layer 114 where fasteners connect the second liner layer 114 with the multilayered composite 200.

In another example, a composition of the second hollow microspheres 214 within the second layer 204 is different than a composition of the first hollow microspheres 212 within the first layer 202. For example, a composition of the second hollow microspheres 214 are selected to provide higher insulative, conductive, and/or noise/impact attenuating properties than the insulative, conductive, and/or noise/impact attenuating properties of the composition of the first hollow microspheres 212. Accordingly, the first layer 202 can have varying properties, such as insulative, conductive, and/or noise/impact attenuating properties, from the second layer 204.

In yet another example, a size of the second hollow microspheres 214 within the second layer 204 is different than a size of the first hollow microspheres 212 within the first layer 202. Accordingly, the first layer 202 can have a varying insulative, conductive, and/or noise/impact attenuating properties from the second layer 204.

Referring back to FIGS. 7 to 10, the multilayered material system 10 further includes a barrier coating 300 on a surface of the multilayered composite 200 to protect against environmental exposure and increase emissivity. The barrier coating 300 can have a variety of architectures, compositions, and thicknesses.

The cellular sandwich panel 100 and a multilayered composite 200 are joined together by a variety of methods to form joint 400, exemplary methods including welding, brazing, diffusion bonding, and fastening. In a specific example, the cellular sandwich panel 100 and a multilayered composite 200 are joined together to form joint 400 using a compositionally graded braze joint. In an example, the compositionally graded braze joint includes a first brazing layer adjacent to the cellular sandwich panel 100 and a second brazing layer adjacent to the multilayered composite 200, wherein the first brazing layer has a coefficient of thermal expansion that is compatible with the cellular sandwich panel 100 and the second brazing layer has a coefficient of thermal expansion that is compatible with the multilayered composite 200. In additional, the compositionally graded braze joint can include third or additional brazing layer intermediate to the first brazing layer and second brazing layer having coefficients of thermal expansion that are intermediate to the coefficient of thermal expansion of the first brazing layer and the second brazing layer. Thus, the compositionally graded braze joint can accommodate a coefficient of thermal expansion mismatch between the cellular sandwich panel 100 and a multilayered composite 200.

Although the multilayered material system 10 is illustrated in a planar configuration, the overall form of the multilayered material system 10 can vary. For example, curved or complex curved surfaces of acreage skin structure, engine inlet structure, leading edge structure, control surface structure, thermo-mechanical isolator structure, or integrated thermal protection systems for internal cold components can be formed from multilayered material system 10.

Figure 11:
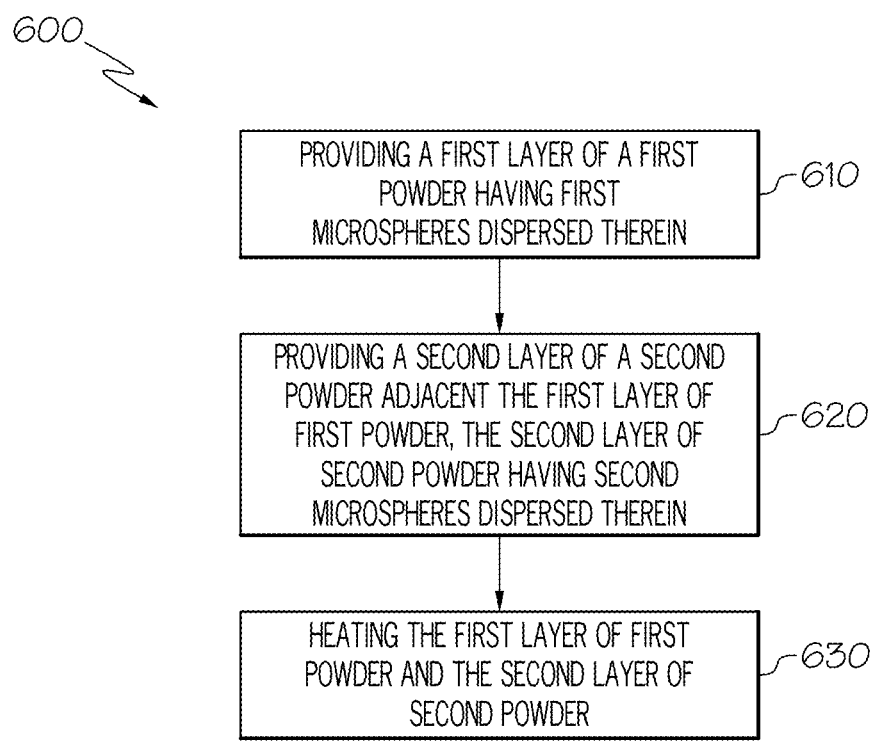
FIG. 11 is flow diagram representing a method for manufacturing the multilayered composite of FIG. 6.

FIG. 11 is flow diagram representing a method 600 for manufacturing the multilayered composite 200 of FIG. 6. The method 600 includes, at block 610, providing a first layer of a first powder having first hollow microspheres 212 dispersed therein, and at block 620, providing a second layer of a second powder adjacent the first layer of first powder, the second layer of second powder having second hollow microspheres 214 dispersed therein. The method 600 further includes, at block 630, heating the first layer of first powder and the second layer of second powder. The heating can occur under various levels of sustained stress and for various durations.

In an example, a melting point or thermal microstructural stability point of the second layer of second powder is greater than a melting point or thermal microstructural stability point of the first layer of first powder. According, a multilayered composite 200 can be provided with a thermal protection gradient functionality as previously described above.

In another example, a volume fraction of hollow microspheres within the second layer of second powder is higher than a volume fraction of hollow microspheres within the first layer of first powder. According, a multilayered composite 200 can be provided with a graded spatial distribution of the hollow microspheres 210 dispersed within a metallic matrix material 220, as previously described.

The first layer of first powder having first hollow microspheres 212 dispersed therein and the second layer of second powder having second hollow microspheres 214 dispersed therein may be provided in various ways. In an example, the first hollow microspheres 212 and second hollow microspheres 214 are pre-mixed into respective first powder and second powder. In another example, the first powder are provided as a first layer in a tool and then the first hollow microspheres 212 are placed within the first layer and the second powder are provided as a second layer in the tool and then the second hollow microspheres 214 are placed within the second layer.

The second layer of second powder can be placed adjacent to the first layer of first powder by a variety of methods. In an example, the first layer of first powder is provided to a tool and then pressed with or without heat. Then the second layer of second powder is provided to the tool on the first layer and then pressed and heated together with the first layer of first powder. In another example, the first layer of first powder is provided to a tool and then an interlayer material, such an interlayer foil or interlayer mesh, is provided on the first layer. Then, the second layer of second powder is provided to the tool on the interlayer material and heated together with the first layer of first powder and the interlayer material. In yet another example, a mold is provided with an interlayer barrier separating a first compartment and second compartment. The first layer of first powder is provided to the first compartment and the second layer of second powder is provided to the second compartment, and then the first layer and second layer are heated together with the interlayer barrier. Thus, the first layer of first powder and second layer of second powder may be placed adjacent to each in various configurations.

In an example, heating the first layer of first powder and the second layer of second powder includes heating the first layer of first powder and the second layer of second powder to a sintering temperature. The heating may include a consolidation process, such as hot isostatic pressing, spark plasma sintering, or cold isostatic pressing and sintering. In another example, heating the first layer of first powder and the second layer of second powder includes heating the first layer of first powder and the second layer of second powder to a heat treatment temperature.

In an aspect, the first layer or the second layer are sintered, consolidated, or heat treated prior to a providing of the other of the first layer or the second layer. For example, the second layer of second powder can have a processing temperature, such as a sintering temperature, consolidation temperature, or heat treatment temperature, that is higher than a melting point or thermal microstructural stability point of the first layer of first powder. Thus, the second layer of second powder can be processed prior to providing of the first layer of first powder, then the first layer of first powder can be subject to processing, such as sintering, consolidation, or heat treatment. Accordingly, a multilayered composite 200 can be provided with a thermal protection gradient functionality as previously described above by separate processing of the first layer of first powder and second layer of second powder.

Figure 12:
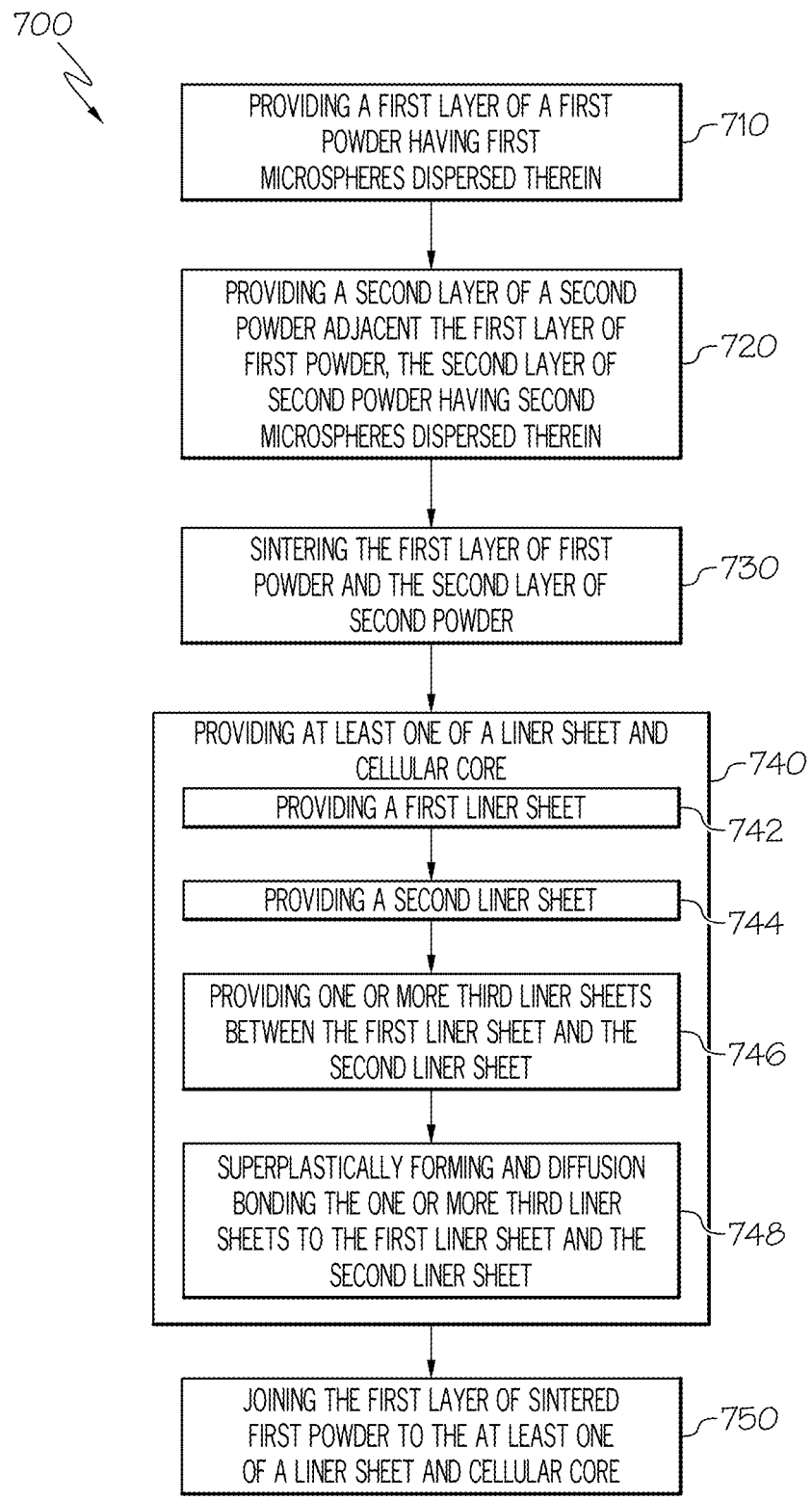
FIG. 12 is a flow diagram representing a method for manufacturing the multilayered material system of FIG. 6.

FIG. 12 is a flow diagram representing a method 700 for manufacturing the multilayered material system 10 of FIG. 6. The method 700 includes, at block 710, providing a first layer of a first powder having first hollow microspheres 212 dispersed therein, at block 720, providing a second layer of a second powder adjacent the first layer of first powder, the second layer of second powder having second hollow microspheres 214 dispersed therein, and, at block 730, sintering the first layer of first powder and the second layer of second powder. The method 700 further includes, at block 740, providing at least one of a liner sheet and a cellular core, and, at block 750, joining the first layer of sintered first powder to the at least one of a liner sheet and cellular core. In some implementations, the first layer of first powder and the second layer of second powder are sintered under necessary stress for necessary length of time.

In an example, a melting point or thermal microstructural stability point of the second layer of second powder is greater than a melting point or thermal microstructural stability point of the first layer of first powder. According, a multilayered composite 200 can be provided with a thermal protection gradient functionality as previously described above.

In another example, a volume fraction of hollow microspheres within the second layer of second powder is higher than a volume fraction of hollow microspheres within the first layer of first powder. According, a multilayered composite 200 can be provided with a graded spatial distribution of the hollow microspheres 210 dispersed within a metallic matrix material 220, as previously described.

The first layer of first powder having first hollow microspheres 212 dispersed therein and the second layer of second powder having second hollow microspheres 214 dispersed therein may be provided in various ways. In an example, the first hollow microspheres 212 and second hollow microspheres 214 are pre-mixed into respective first powder and second powder. In another example, the first powder are provided as a first layer in a tool and then the first hollow microspheres 212 are placed within the first layer and the second powder are provided as a second layer in the tool and then the second hollow microspheres 214 are placed within the second layer.

The second layer of second powder can be placed adjacent to the first layer of first powder by a variety of methods. In an example, the first layer of first powder is provided to a tool and then pressed with or without heat. Then the second layer of second powder is provided to the tool on the first layer and then pressed and heated together with the first layer of first powder. In another example, the first layer of first powder is provided to a tool and then an interlayer material, such an interlayer foil or interlayer mesh, is provided on the first layer. Then, the second layer of second powder is provided to the tool on the interlayer material and heated together with the first layer of first powder and the interlayer material. In yet another example, a mold is provided with an interlayer barrier separating a first compartment and second compartment. The first layer of first powder is provided to the first compartment and the second layer of second powder is provided to the second compartment, and then the first layer and second layer are heated together with the interlayer barrier. Thus, the first layer of first powder and second layer of second powder may be placed adjacent to each in various configurations.

In an example, the sintering the first layer of first powder and the second layer of second powder includes a consolidation process, such as hot isostatic pressing, spark plasma sintering, or cold isostatic pressing and sintering.

In an aspect, the first layer or the second layer are sintered prior to a providing of the other of the first layer or the second layer. For example, the second layer of second powder can have a sintering temperature that is higher than a melting point or thermal microstructural stability point of the first layer of first powder. Thus, the second layer of second powder can be sintered prior to providing of the first layer of first powder, then the first layer of first powder can be subject to sintering. Accordingly, a multilayered composite 200 can be provided with a thermal protection gradient functionality as previously described above by separate processing of the first layer of first powder and second layer of second powder.

The cellular sandwich panel 100 can take a variety of forms at previously described and may be formed according to a variety of methods. In an example, the step of providing the at least one of a liner sheet and cellular core includes, at block 742, and a step of providing a first liner sheet 110, at block 744, a step of providing a second liner sheet 120. The step of providing the at least one of a liner sheet and cellular core further includes, at block 746, providing one or more third liner sheets 132 between the first liner sheet 110 and the second liner sheet 120, and, at block 748, superplastically forming and diffusion bonding the one or more third liner sheets to the first liner sheet and the second liner sheet.

The step of joining the first layer of sintered first powder to the at least one of a liner sheet and cellular core may be performed by a variety of methods. Exemplary methods include welding, brazing, diffusion bonding, and fastening. In a specific example, the at least one of a liner sheet and cellular core and a multilayered composite 200 are joined together to form joint 400 using a compositionally graded braze joint. In an example, the step of joining the first layer of sintered first powder to the at least one of a liner sheet and cellular core includes providing a first brazing layer adjacent to the at least one of a liner sheet and cellular core and a second brazing layer adjacent to the multilayered composite 200. The first brazing layer can have a coefficient of thermal expansion that is compatible with the cellular sandwich panel 100 and the second brazing layer can have a coefficient of thermal expansion that is compatible with the multilayered composite 200. In additional, the compositionally graded braze joint can include third or additional brazing layer intermediate to the first brazing layer and second brazing layer having coefficients of thermal expansion that are positioned intermediate to the coefficient of thermal expansion of the first brazing layer and the second brazing layer. Thus, the compositionally graded braze joint can accommodate a coefficient of thermal expansion mismatch between the at least one of a liner sheet and cellular core and a multilayered composite 200.

The above description describes numerous materials. It should be understood that "metal/metallic" includes "metals and metal matrix composites"; "ceramic" includes "ceramics and ceramic matrix composites"; and "hybrid metal-ceramic" includes "metal-ceramic hybrid and metal matrix composite/ceramic matrix composite hybrid". Also, metallic bases include aluminum and aluminum alloys/metal matrix composites; titanium and titanium alloys/metal matrix composites; superalloys (including iron and iron alloys/metal matrix composites, nickel and nickel alloys/metal matrix composites, cobalt and cobalt alloys/metal matrix composites); refractory metals and alloys/metal matrix composites; copper and copper alloys/metal matrix composites; precious metals and alloys/metal matrix composites; zirconium and hafnium and their alloys/metal matrix composites; intermetallics; complex concentrated alloys/metal matrix composites (high entropy alloys/metal matrix composites, medium entropy alloys/metal matrix composites, multicomponent alloys/metal matrix composites).

It should be apparent that each of the graded multilayered composite 1100 of FIG. 1, the graded multilayered material system 1200 of FIG. 2, the multilayered material systems 1300a-1300g of FIGS. 3A-3E, and the multilayered material systems 10 of FIGS. 7-10 disclosed herein comprises either a tuned multilayered composite or a multilayered material system that can operate under stringent thermomechanical loading requirements, such as on an aircraft.

Figure 13:
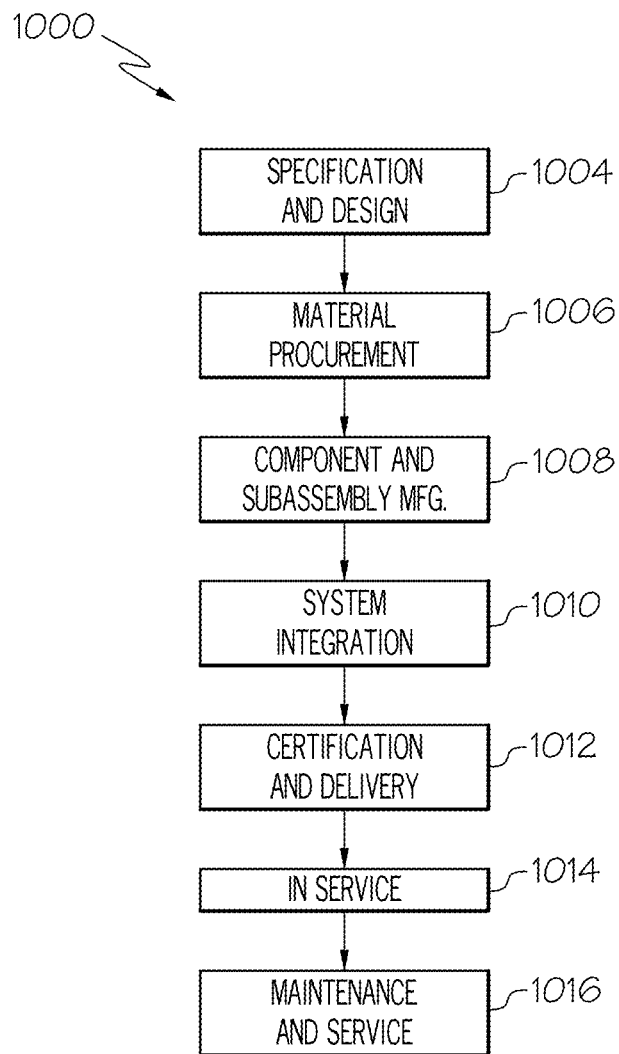
FIG. 13 is a flow diagram of an aircraft manufacturing and service methodology.
Figure 14:
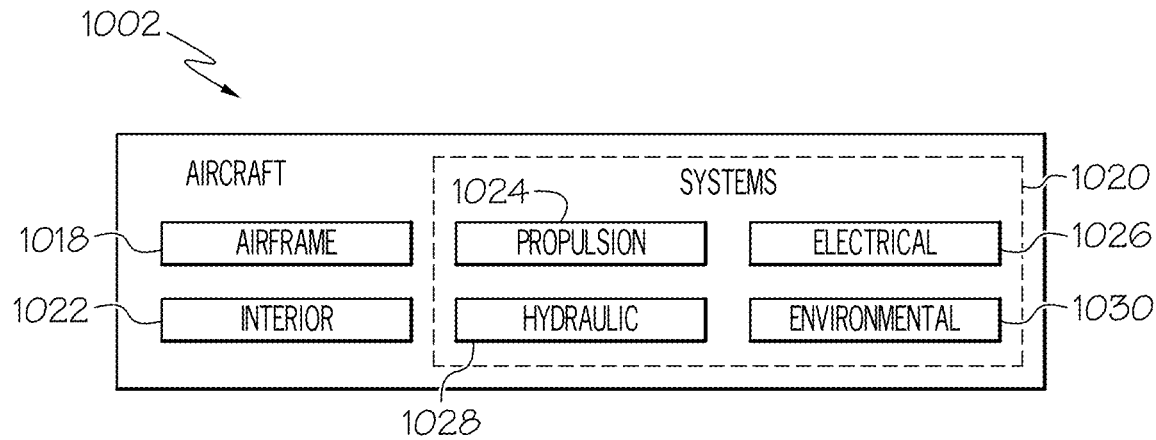
FIG. 14 is a block diagram of an aircraft.

Examples of the present disclosure may be described in the context of an aircraft manufacturing and service method 1000, as shown in FIG. 13, and an aircraft 1002, as shown in FIG. 14. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Any combination of the graded multilayered composite 1100 of FIG. 1, the graded multilayered material system 1200 of FIG. 2, the multilayered material systems 1300a-1300g of FIGS. 3A-3E, and the multilayered material systems 10 of FIGS. 7-10 may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 14, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The multilayered material system 10 of the present disclosure may be employed for any of the systems of the aircraft 1002.

Although various examples of the disclosed multilayered material systems and multilayered composites have been shown and described, modifications may occur to those skilled in the art upon reading the specification. The present application includes such modifications and is limited only by the scope of the claims.

What is claimed is:
1. A graded multilayered composite, comprising:
   a sintered metal matrix material, having a first edge on a first side of the sintered metal matrix material and a second edge on a second side of the sintered metal matrix material, opposite the first side, the sintered metal matrix material having a sintered metal matrix throughout the sintered metal matrix material from the first edge to the second edge;
   a first layer of hollow microspheres, located on the first side of the sintered metal matrix material;
   a second layer of hollow microspheres, located on the second side of the sintered metal matrix material; and
   one or more cooling channels in the sintered metal matrix material between the first edge and the second edge, wherein:
      hollow microspheres of the first layer of hollow microspheres are spatially distributed relative to each other according to a first spatial gradation, each hollow microsphere having a void therein defining a void volume,
      hollow microspheres of the second layer of hollow microspheres are spatially distributed relative to each other according to a second spatial gradation, each hollow microsphere having a void therein defining a void volume, the first spatial gradation is based upon one of a number of the hollow microspheres in the first layer of hollow microspheres or a size of the hollow microspheres in the first layer of hollow microspheres, and the second spatial gradation is based upon one of a number of the hollow microspheres in the second layer of hollow microspheres or a size of the hollow microspheres in the second layer of hollow microspheres, wherein a total void volume fraction of the second layer is less than a total void volume fraction of the first layer.

2. The graded multilayered composite of claim 1, wherein the second spatial gradation is different from the first spatial gradation.

3. The graded multilayered composite of claim 1, further comprising:
a first buffer region defined between the first layer of hollow microspheres and the first edge on the first side of the sintered metal matrix material; and
a second buffer region, defined between the second layer of hollow microspheres and the second edge on the second side of the sintered metal matrix material; and
wherein each of the first buffer region and the second buffer region is substantially devoid of hollow microspheres.

4. The graded multilayered composite of claim 1, wherein the first spatial gradation is based upon the number of the hollow microspheres in the first layer of hollow microspheres, and the second spatial gradation is based upon the number of the hollow microspheres in the second layer of hollow microspheres.

5. The graded multilayered composite of claim 1, wherein the first spatial gradation is based upon the size of the hollow microspheres in the first layer of hollow microspheres, and the second spatial gradation is based upon the size of the hollow microspheres in the second layer of hollow microspheres.

6. The graded multilayered composite of claim 1, wherein the hollow microspheres of the first layer of hollow microspheres and the hollow microspheres of the second layer of hollow microspheres comprise a ceramic material.

7. The graded multilayered composite of claim 1, wherein the hollow microspheres of the first layer of hollow microspheres and the hollow microspheres of the second layer of hollow microspheres comprise at least one of yttria-stabilized zirconia and alumina-silica-iron glass.

8. The graded multilayered composite of claim 1, wherein at least one of the hollow microspheres of the first layer of hollow microspheres and at least one of the hollow microspheres of the second layer of hollow microspheres is between 5 microns and 500 microns in diameter.

9. The graded multilayered composite of claim 1, wherein each of the hollow microspheres of the first layer of hollow microspheres and each of the hollow microspheres of the second layer of hollow microspheres has a diameter and an average wall thickness between 2 percent and 30 percent of the diameter.

10. The graded multilayered composite of claim 1, wherein the sintered metal matrix material comprises a compositionally graded material.

11. The graded multilayered composite of claim 10, wherein a composition of the sintered metal matrix material comprises at least one of aluminum, aluminum alloy, aluminum metal matrix composite, titanium, titanium alloy, titanium metal matrix composite, iron, iron alloy, iron metal matrix composite, nickel, nickel alloy, nickel metal matrix composite, cobalt, cobalt alloy, cobalt metal matrix composite, a refractory metal, a refractory metal alloy, a refractory metal matrix composite, copper, a copper alloy, copper metal matrix composite, a precious metal, a precious metal alloy, a precious metal matrix composite, zirconium, a zirconium alloy, zirconium metal matrix composite, hafnium, a hafnium alloy, and hafnium metal matrix composite.

12. The graded multilayered composite of claim 1, wherein a density of a first portion of the graded multilayered composite is different from a density of a second portion of the graded multilayered composite, wherein the sintered metal matrix material comprises a compositionally graded material, wherein the hollow microspheres of the first layer of hollow microspheres are spatially distributed relative to each other, wherein the hollow microspheres of the second layer of hollow microspheres are spatially distributed relative to each other, and wherein a distribution of the hollow microspheres of the first layer of hollow microspheres is different than a distribution of the hollow microspheres of the second layer of hollow microspheres.

13. The graded multilayered composite of claim 12, further comprising:
a first buffer region defined between the first layer of hollow microspheres and the first edge on the first side of the sintered metal matrix material; and
a second buffer region defined between the second layer of hollow microspheres and the second edge on the second side of the sintered metal matrix material;
wherein each of the first buffer region and the second buffer region is substantially devoid of hollow microspheres.

14. A multilayered material system comprising:
the graded multilayered composite of claim 1; and
a layer, joined to the graded multilayered composite and selected from a monolithic or graded metallic liner, a monolithic or graded ceramic, a monolithic or graded metallic-ceramic hybrid liner, a monolithic or graded metallic core, a monolithic or graded cooling channel structure, or a monolithic or graded environmental barrier coating.

15. A method for manufacturing the multilayered material system of claim 11, the method comprising:
joining the layer to the graded multilayered composite to provide the multilayered material system.

16. A graded multilayered composite, comprising:
a sintered metal matrix material, having a first edge on a first side of the sintered metal matrix material and a second edge on a second side of the sintered metal matrix material, opposite the first side, the sintered metal matrix material having a sintered metal matrix throughout the sintered metal matrix material from the first edge to the second edge, the sintered metal matrix material comprising a compositionally graded material;
a first layer of hollow microspheres, located on the first side of the sintered metal matrix material, each hollow microsphere having a void therein defining a void volume; and
a second layer of hollow microspheres, located on the second side of the sintered metal matrix material, each hollow microsphere having a void therein defining a void volume; and
one or more cooling channels in the sintered metal matrix material between the first edge and the second edge,
wherein hollow microspheres of the first layer of hollow microspheres are spatially distributed relative to each other according to a first spatial gradation, wherein hollow microspheres of the second layer of hollow microspheres are spatially distributed relative to each other according to a second spatial gradation, wherein the first spatial gradation is based upon one of a number of the hollow microspheres in the first layer of hollow microspheres or a size of the hollow microspheres in the first layer of the hollow microspheres, wherein the second spatial gradation is based upon one of a number of the hollow microspheres in the second layer of hollow microspheres or a size of the hollow microspheres in the second layer of hollow microspheres, and wherein the second spatial gradation is different from the first spatial gradation, wherein a total void volume fraction of the second layer is less than a total void volume fraction of the first layer.

17. A graded multilayered composite comprising:

a sintered metal matrix material having a first edge on a first side of the sintered metal matrix material and a second edge on a second side of the sintered metal matrix material opposite the first side, the sintered metal matrix material having a sintered metal matrix throughout the sintered metal matrix material from the first edge to the second edge;

a first layer of hollow microspheres dispersed on the first side of the metal matrix material, each hollow microsphere having a void therein defining a void volume; and a second layer of hollow microspheres dispersed on the second side of the metal matrix material, each hollow microsphere having a void therein defining a void volume; and one or more cooling channels in the sintered metal matrix material between the first edge and the second edge, wherein a total void volume fraction of the second layer is less than a total void volume fraction of the first layer.

18. The graded multilayered composite of claim 17, wherein the sintered metal matrix material comprises a compositionally graded material.

19. The graded multilayered composite of claim 17, wherein the hollow microspheres of the first layer of hollow microspheres and the hollow microspheres of the second layer of hollow microspheres comprise a ceramic material.

20. The graded multilayered composite of claim 17, further comprising:

a first buffer region defined between the first layer of hollow microspheres and the first edge on the first side of the sintered metal matrix material; and a second buffer region defined between the second layer of hollow microspheres and the second edge on the second side of the sintered metal matrix material, wherein each of the first buffer region and the second buffer region is substantially devoid of hollow microspheres.

* * * * *